US007987407B2

(12) United States Patent
Gille et al.

(10) Patent No.: US 7,987,407 B2
(45) Date of Patent: Jul. 26, 2011

(54) HANDLING OF HARD ERRORS IN A CACHE OF A DATA PROCESSING APPARATUS

(75) Inventors: Damien Rene Gille, Juan-les-Pins (FR); Luc Orion, Mouans Sartoux (FR)

(73) Assignee: ARM Limited, Cambridge (GB)

( * ) Notice: Subject to any disclaimer, the term of this patent is extended or adjusted under 35 U.S.C. 154(b) by 33 days.

(21) Appl. No.: 12/461,695

(22) Filed: Aug. 20, 2009

(65) Prior Publication Data

US 2011/0047408 A1    Feb. 24, 2011

(51) Int. Cl.
    *G11C 29/00*    (2006.01)
(52) U.S. Cl. .......................... 714/764; 714/20
(58) Field of Classification Search .................. 702/130; 709/206; 711/118; 714/15, 5, 63, 758, 764, 714/20
    See application file for complete search history.

(56) References Cited

U.S. PATENT DOCUMENTS

| 3,781,796 | A  |     | 12/1973 | Smith              |        |
|-----------|----|-----|---------|--------------------|--------|
| 4,506,362 | A  |     | 3/1985  | Morley             |        |
| 5,119,485 | A  |     | 6/1992  | Ledbetter et al.   |        |
| 5,835,504 | A  |     | 11/1998 | Balkin et al.      |        |
| 6,014,756 | A  | *   | 1/2000  | Dottling et al.    | 714/15 |
| 6,539,503 | B1 |     | 3/2003  | Walker             |        |
| 6,832,329 | B2 | *   | 12/2004 | Ahrens et al.      | 714/5  |
| 6,892,159 | B2 | *   | 5/2005  | Weiss et al.       | 702/130 |
| 6,948,094 | B2 | *   | 9/2005  | Schultz et al.     | 714/15 |
| 7,328,391 | B2 |     | 2/2008  | Hart et al.        |        |
| 2007/0094569 | A1 | * | 4/2007  | Thayer et al.      | 714/763 |
| 2008/0201441 | A1 | * | 8/2008  | Bodic et al.       | 709/206 |
| 2009/0164727 | A1 | * | 6/2009  | Penton et al.      | 711/118 |

OTHER PUBLICATIONS

Bondavalli et al., "Discriminating Fault Rate and Persistency to Improve Fault Treatment", *Proceedings of the 27th International Symposium on Fault-Tolerant Computing*, 1997, 9 pages.
Constantinescu, "Impact of Deep Submicron Technology on Dependability of VLSI Circuits", *IEEE*, 2002, 5 pages.
Lee et al., "Performance of Graceful Degradation for Cache Faults", *IEEE Computer Society Annual Symposium on VLSI*, 2007, 7 pages.
Bossen et al., "Power4 System Design for High Reliability", *IEEE*, 2002, pp. 16-24.
J.W. McPherson, "Reliability Challenges for 45nm and Beyond" *DAC 2006*, Jul. 2006, pp. 176-181.

* cited by examiner

*Primary Examiner* — David Ton
(74) *Attorney, Agent, or Firm* — Nixon & Vanderhye P.C.

(57)                    ABSTRACT

A data processor includes a cache record error storage and a hard error storage having at least one record error storage and at least one hard error record, respectively, both for keeping track of errors detected when accessing cache records. When an error is first detected, one of the error records in the cache record error storage is allocated to store a cache record identifier for that cache record, and an associated count value is set to a first value. If an error is detected when accessing a cache record, a correction operation is performed in respect of that currently accessed cache record, and access to that currently accessed cache record is then re-performed. If the count value reaches a predetermined threshold value, then the cache record identifier is moved from the cache record error storage to an error record of the hard error storage.

20 Claims, 14 Drawing Sheets

ECC ERROR BANK

| INDEX | WAY (ONE HOT) | ERROR LOCATION (TAG OR DATA) | COUNTER |
|---|---|---|---|
|  |  |  |  |
|  |  |  |  |
|  |  |  |  |
|  |  |  |  |

HARD ERROR BANK

| INDEX | WAY (ONE HOT) | ERROR LOCATION (TAG OR DATA) | V |
|---|---|---|---|
|  |  |  |  |
|  |  |  |  |

HANDLING OF HARD ERRORS IN A CACHE OF A DATA PROCESSING APPARATUS

BACKGROUND OF THE INVENTION

1. Field of the Invention

The present invention relates to techniques for handling errors in a data processing apparatus, and more particularly relates to a data processing apparatus and method for automatically handling hard errors that occur in a cache of the data processing apparatus.

2. Description of the Prior Art

There are many applications for data processing systems where fault tolerance is an important issue. One such application is in safety critical systems, for example automotive systems that control air bags, braking systems, etc. One particular area of fault tolerance is tolerance to errors that can occur in the data stored within the data processing system. A typical data processing apparatus may include one or more storage devices used to store data values used by the data processing apparatus. As used herein, the term "data value" will be used to refer to both instructions executed by a processing device of the data processing apparatus, and the data created and used during execution of those instructions.

The storage devices within the data processing apparatus are vulnerable to errors. These errors may be soft errors, as for example may be caused by neutron strikes, where the state of data held in the storage device can be changed, but the storage device will still write and read data correctly. Such soft errors are also referred to as transient faults. Alternatively, the errors may be hard errors, as for example caused by electro-migration, in which the affected memory location(s) within the storage device will always store an incorrect data value, and the error cannot be corrected by re-writing the data value to the storage device location(s). Such hard errors are also referred to as permanent faults. Both soft errors and hard errors can often be corrected using known error correction techniques, so that the correct data value can be provided to the requesting device, for example a processor core. However, for the example of a hard error, if the corrected data value is then written back to the same memory location, it will again be stored incorrectly at that memory location, since the hard error stems from a fault in the storage device itself.

As well as permanent faults and transient faults, another type of error which can occur is an intermittent fault, such a fault for example being caused by certain environmental conditions in which the storage device operates. Whilst those fault triggering environmental conditions are present, the intermittent fault appears as a hard error, but the fault disappears when the environmental conditions change to be more favourable.

As process geometries shrink, and accordingly the storage devices become smaller and smaller, those storage devices become increasingly vulnerable to errors, and hence it is becoming increasingly important in fault tolerant systems to provide robust techniques for detecting such errors. For example, the articles "Impact of Deep Submicron Technology on Dependability of VLSI Circuits" by C Constantinescu, 0-7695-1597-5/02/$1700 (C) 2002 IEEE, and "Reliability Challenges for 45 nm and Beyond" by J W McPherson, DAC 2006, Jul. 24-28, 2006, San Francisco, Calif., USA, identify that reduced process geometries give rise to higher occurrences of faults, especially transient and intermittent faults.

Often, hard error faults occur due to manufacturing defects. Accordingly, it is known to perform certain hard error detection techniques at production time in order to seek to identify such hard errors. As an example, the article "Nonvolatile Repair Caches Repair Embedded SRAM and New Nonvolatile Memories" by J Fong et al, Proceedings of the 19th IEEE International Symposium on Defect and Fault Tolerance in VLSI Systems (DFT'04) describes a non-volatile repair cache that can be used to repair random defective memory cells in embedded SRAMs and other memory devices. The repair cache takes the form of a direct mapped cache having multiple entries used to identify predetermined repair addresses. When an access request is issued by a processing unit, the memory address specified by that access request is compared with the predetermined repair addresses identified in the various entries of the repair cache, and in the event of a hit the access proceeds with respect to the data held in a register bank of the repair cache, with the main memory's write or read signal being blocked. In the event of a repair cache miss, then the write or read operations will be executed within the main memory bank. In addition to a direct mapped repair cache, an n way set associative repair cache is also discussed. The repair cache is populated at wafer test stage, i.e. during production. Accordingly, whilst the described technique can be used to redirect accesses to addresses where hard errors are detected at production time, the technique does not assist in handling hard errors that occur after production, for example due to process variation and aging, nor is it of any assistance in handling soft errors.

To assist in the detection and handling of errors occurring post production, it is known to store error correction code (ECC) data or the like (generally referred to as error data herein) which can be stored in association with the data values, for reference when seeking to detect any errors in those stored data values.

One known error correction technique which makes use of such error data applies an error correction operation to data values when they are read out from the storage device, and before the data values are supplied to the requesting device. If an error is detected, the process aims to correct the data value using the associated error data and then supplies the corrected data to the requesting device. However, typically the corrected data is not written back to the storage device itself, nor is any attempt made to determine whether the error was a soft error or a hard error.

Whilst such an "in-line" correction technique can handle both hard and soft errors provided they are correctable (i.e. provided sufficient redundant information is available to be able to calculate what the true data value is), it suffers from a number of disadvantages. Firstly, additional logic is required on the read path, and this can adversely affect the timing of the read operation, and also adversely affects power consumption. Such an approach may also require control logic to stall the device performing the read operation (for example a processor pipeline). Additionally, because the data in the storage device is not corrected, there is a possibility that further errors could occur, and that the accumulating errors may change over time from being correctable to uncorrectable, or even undetectable. To seek to address this issue, some data processing systems provide an error "scrubber" mechanism that is used to periodically test and correct the data stored in the storage device. However, this mechanism requires time, and consumes energy.

As an alternative to such an in-line mechanism as described above, an alternative mechanism that could be attempted would be to detect and correct the data value when it is read, to store the corrected data value back to the memory device, and then to retry the read operation (referred to herein as a correct and retry mechanism). In the case of a soft error, this has the effect of correcting the data in the storage device, and hence when the read operation is retried, the correct data is read. However, if the error is a hard error, then the error will re-occur when the read is retried, and the operation will hence enter a loop where the data value is corrected, but continues to be wrong when re-read from the storage device. In this situation there is the potential for the system to "spin-lock", trapped in a loop of accessing, attempting correction and retrying, unless mechanisms are in place to spot such a behaviour and break out of the loop.

Whilst the above issues are generally applicable to any type of storage device provided within the data processing apparatus, further specific issues can arise if the storage device in question is a cache. One or more caches are often provided within a data processing apparatus to temporarily store data values required by a processing unit of the data processing apparatus so as to allow quick access to any such cached data values. As is known in the art, the cache will typically consist of a plurality of cache lines, and for each cache line storing valid data, an address identifier is provided within the cache identifying an address portion which is shared with all of the data values in that cache line. When an access request is issued specifying a memory address associated with a cacheable region of memory, a lookup procedure will be performed in the cache to seek to identify whether a portion of the memory address specified in the access request matches an address identifier in the cache, and if it does the access may proceed directly in the cache without the need to access the memory.

If a write through (WT) mode of operation is used for the cache lines, then any write updates made to the cache line contents will be replicated in memory so as to maintain consistency between the cache contents and the memory contents. However, if a write back (WB) mode of operation is employed, then any updates made to the contents of a cache line are not immediately replicated in the corresponding locations in memory. Instead, only when a cache line is later evicted, is the relevant data in memory brought up to date with the contents in the cache line (the need to do this is typically indicated by a dirty bit value, which is set if the cache line contents are written to whilst stored in the cache).

Considering the issue of hard or soft errors occurring in a cache, then as with other storage devices error correction code data can be stored in association with the cache contents with the aim of enabling errors to be detected.

If the cache can be arranged as a write through cache, then there are two possible approaches that can be taken on detection of an error in a particular cache line. In accordance with a first technique (which will be referred to herein as an "assume miss and invalidate" approach), the access can simply be considered to have missed in the cache. The data will then be retrieved from a lower level in the memory hierarchy. At the same time, in order to prevent errors accumulating in the cache, the cache line is invalidated. The data retrieved may typically be streamed into the device requesting the data, for example the processor core, but often will be reallocated into the cache. If the original error occurred as the result of a hard error, and the refetched data from memory is allocated into the same cache line, then the next time the data is accessed in the cache, the same error is likely to be detected again. This will potentially cause significant performance degradation.

In accordance with a second, alternative, technique for a write through cache (referred to as an "invalidate and retry" mechanism), on detection of an error in a particular cache line, that cache line can merely be invalidated and the access retried without the need to seek to perform any correction on the data held in the cache line. When the access is retried, a miss will occur in the cache, and the data will be retrieved from a lower level in the memory hierarchy. As with the first technique, this retrieved data may typically be streamed into the device requesting the data, for example the processor core, but often will be reallocated into the cache, so that a cache hit will occur on the next access. If the original error occurred as the result of a hard error then, when the access is retried, the same error is likely to be detected again. The processor will get stuck in a spinlock, continually retrying the access and detecting the error.

The problems become even more complex if the cache is at least partially a write back cache, since if an error is detected in a cache line using such a write back mechanism, then it is not merely sufficient to invalidate the cache line, but instead the cache line contents must first be corrected and then evicted to memory. Accordingly the "assume miss and invalidate" approach that can be applied to a write through cache cannot be used for a write back cache, because the cache line with the error in it may be valid and dirty, and hence if the first technique were used the dirty data would be lost. The "invalidate and retry" approach can be used, but as part of the invalidate operation the cache line will need to be corrected (i.e. a correct and retry style operation is needed). This applies not only to the data values in the cache line itself, but also to the associated address identifier, and associated control data such as the valid bit indicating if the cache line is valid and the dirty bit indicating if the cache line is dirty, since all of these contents may potentially be subject to errors. Hence, by way of example, if the valid bit is itself corrupted by an error, the cache line that holds valid data may appear from the associated valid bit to not hold valid data. Accordingly, when adopting a write back mode of operation in a cache, it may be necessary to perform error detection and correction even on cache lines that on face value appear to be invalid.

A number of papers have been published concerning the detection and handling of errors occurring in caches. For example, the article "PADded Cache: A New Fault-Tolerance Technique for Cache Memories", by P Shirvani et al, Center for Reliable Computing, Stanford University, $17^{th}$ (1999) IEEE VLSI Test Symposium, describes a technique that uses a special programmable address decoder (PAD) to disable faulty blocks in a cache and to re-map their references to healthy blocks. In particular, a decoder used in a cache is modified to make it programmable so that it can implement different mapping functions. A group of flip-flops within the decoder are connected as a shift register and loaded using special instructions. Accordingly, it will be appreciated that the approach described therein is one that would be employed as part of a Built-In Self Test (BIST) procedure, and hence requires the faulty blocks in the cache to be identified, and the programmable address decoder programmed, prior to normal operation of the data processing apparatus. The technique can hence not be used to handle errors that only manifest themselves during normal operation.

The article "Performance of Graceful Degradation for Cache Faults" by H Lee et al, IEEE Computer Society Annual Symposium on VLSI(ISVLSI'07) examines several strategies for masking faults, by disabling faulty resources such as lines, sets, ways, ports or even the whole cache. A cache set remapping scheme is also discussed for recovering lost performance due to failed sets. As explained in Section 5.2, it is assumed that the faults in the cache memory are detected and necessary cache reconfiguration is done before program execution. Hence, as with the earlier-mentioned article, the techniques described therein cannot be used to handle errors that manifest themselves during normal operation, for example soft errors, or hard errors that occur for example through aging.

The article "Power4 System Design for High Reliability" by D Bossen et al, IBM, pages 16 to 24, IEEE Micro, March-April 2002, provides a general discussion of fault tolerance, and describes some specific schemes employed in association with a cache. A level 1 data cache is identified which is arranged as a store-though design (equivalent to the write through design mentioned earlier), so as to allow error recovery by flushing the affected cache line and refetching the data from a level 2 cache. The paper also discusses use of hardware and firmware to track whether the particular ECC mechanism corrects permanent errors beyond a certain threshold, and after exceeding this threshold the system creates a deferred repair error log entry. Using these error log entries, mechanisms such as a cache line delete mechanism can be used to remove a faulty cache line from service. A BIST-based mechanism is also described where programmable steering logic permits access to cache arrays to replace faulty bits. Hence, it can be seen that the techniques described in this paper involve either arranging the cache as a simple write through cache, or alternatively require the need for complex techniques to maintain logs of errors and make decisions based on the log entries, such techniques consuming significant power and taking up significant area within the data processing apparatus. Moreover, it implies that the development and configuration of a dedicated firmware is the appropriate way to handle faults. There are many applications where such power and area hungry mechanisms will not be acceptable. Further, there is no discussion of the earlier-mentioned problems that can occur particularly in write back caches, and in particular no discussion as to how hard errors in such write back caches could be handled.

With the above issues in mind, commonly owned co-pending U.S. patent application Ser. No. 12/004,476 (the entire contents of which are hereby incorporated by reference) describes a mechanism for handling errors occurring within a cache of a data processing apparatus, which can yield improved performance relative to the earlier-mentioned "in-line" correction mechanisms, and which can be used not only in association with write through caches but also write back caches. In accordance with the technique described therein, a cache location avoid storage having at least one record is provided within the data processing apparatus, with the cache location avoid storage being populated during normal use of the data processing apparatus. If an error condition, is detected when accessing a cache line of the cache, then a record in the cache location avoid storage is allocated to store the cache line identifier for that cache line in which the error condition was detected. Further, a clean and invalidate operation is performed in respect of that cache line and the access is then re-performed. When performing lookup operations in the cache, the cache access circuitry excludes from that lookup procedure any cache line identified in the cache location avoid storage.

Through use of the technique described in U.S. application Ser. No. 12/004,476, it can be ensured that errors occurring in the cache storage do not cause incorrect operation when accesses are performed in respect of the cache storage, whilst allowing the advantages of an invalidate and retry/correct and retry mechanism to be retained, such as the fact that the error detection mechanism can be provided on a separate path to the normal data retrieval path (providing both power and timing benefits). However, entries are made in the cache location avoid storage irrespective of whether the errors causing those entries to be made are soft errors or hard errors, and whilst such an approach ensures that if the error detected was in fact a hard error it cannot cause operability problems in the operation of the cache storage, it also results in cache lines being excluded unnecessarily, if the error in that cache line was in fact a soft error.

U.S. Pat. No. 4,506,362 describes a systematic data memory error detection and correction apparatus that periodically reads data from each addressable memory location, determines the presence or absence of an error in the addressed data memory location and, if an error is detected, corrects the error and writes the corrected data back into the addressed memory location. The apparatus may include circuitry for logging those areas of the data memory where errors have been detected, such logging showing either the address location where an error is detected or alternatively indicating the repetitiveness of an error at any particular addressed memory location. Such data logging can facilitate the determination of hard errors rather than soft errors. In one example use case, it is indicated that upon detection of a hard error, it will be possible to re-map the address space at the chip level, with an entire chip select signal being switched to another chip location where some redundant storage is provided.

However, by performing error detection and correction on a periodic basis, this can have a significant impact on the performance of the memory, for example in situations where errors are only occurring relatively infrequently and hence much of the detection and correction processing performs no useful result. Further, no error containment mechanism is provided based on the logging information, other than discussing the possibility of switching to a completely separate chip location in the event that a hard error is deduced from the logging information. However, such an approach would require the provision of a significant amount of redundant storage, which would be unduly expensive for many implementations. Furthermore, the approach described cannot guarantee that an error will not be present at the time any particular data is used by associated processing circuitry (for example because an error occurs between the periodic error detection and correction process, and in that interim period the data is accessed by the processing circuitry). In such a situation, there will be an error in the data as accessed by the processing circuitry, and that error will not be detected at the time of use of that data by the processing circuitry.

The article "Discriminating Fault Rate and Persistency to Improve Fault Treatment" by A Bondavalli et al, Proceedings of the 27th International Symposium on Fault-Tolerant Computing (FTCS '97), describes a mechanism designed to discriminate intermittent and permanent faults against low rate, low persistency transient faults, with the aim of improving fault treatment, and so the overall system performance. The mechanism employs a count and threshold approach, coupled with a simple decay algorithm to take into account the timing traits of intermittent faults. The system described includes a number of redundant components, and the aim of the described mechanism is to notify all components affected by permanent or intermittent faults (referred to as faulty units) as quickly as possible, whilst avoiding notifying any units other than faulty units (such units being referred to as healthy units). Healthy units are those that are only affected by temporary transient faults.

Hence, in accordance with the mechanism described in the above paper, a count is incremented each time a permanent or intermittent fault is detected for a component, and when that count reaches a threshold value, the corresponding unit is identified as a faulty unit. However, the unit will need to be reutilised several times in order for the count in respect of that unit to reach the threshold value, and it may hence take a significant period of time before any particular unit is identified as a faulty unit. The probability of re-triggering the fault is very dependent on the workload of the unit and cannot be enforced by the system. Furthermore, the technique would not appear to be applicable to cache type structures where the occurrence of an error does not result from the use of the cache per se, but depends on which parts of the cache are accessed.

It would be desirable to provide an improved technique for identifying hard errors in the various cache records of a cache storage.

SUMMARY OF THE INVENTION

Viewed from a first aspect, the present invention provides a data processing apparatus comprising: processing circuitry for performing data processing operations; cache storage having a plurality of cache records for storing data values for access by the processing circuitry when performing said data processing operations, each cache record for storing one or more data values, an associated address indication for said one or more data values, and error detection data; cache control circuitry for controlling access to said cache storage, said cache control circuitry including error detection circuitry, responsive to a cache record of the cache storage being accessed, to perform an error detection operation to determine with reference to the error detection data stored in said cache record whether an error condition exists for said cache record; cache record error storage having at least one error record, each error record for storing a cache record identifier identifying a cache record for which said error condition has been detected, and an associated count value; on performance of said error detection operation for a currently accessed cache record, the error detection circuitry causing said cache record error storage to be accessed to determine whether the cache record identifier for said currently accessed cache record is already stored in the cache record error storage; if the cache record identifier for said currently accessed cache record is already stored in the cache record error storage, then if the error condition is detected on performance of said error detection operation, said count value associated with that cache record identifier is adjusted in a first direction, and if the error condition is not detected on performance of said error detection operation, said count value associated with that cache record identifier is adjusted in a second direction; if the cache record identifier for said currently accessed cache record is not already stored in the cache record error storage, and said error condition is detected on performance of said error detection operation, one of said at least one error records in the cache record error storage is allocated to store the cache record identifier for the currently accessed cache record, and the associated count value is set to a first value; on detection of said error condition when performing said error detection operation, the error detection circuitry further causing a correction operation to be performed in respect of the currently accessed cache record, and causing the access to the currently accessed cache record to be re-performed; the data processing apparatus further comprising a hard error storage having at least one hard error record, when the associated count value for a cache record identifier stored in the cache record error storage reaches a predetermined threshold value, said cache record identifier being stored in one of said at least one hard error records of the hard error storage; and any cache record whose cache record identifier is stored in the hard error storage being logically excluded from the plurality of cache records of the cache storage for the purposes of subsequent operation of the cache storage.

In accordance with the present invention, both a cache record error storage having at least one error record, and a hard error storage having at least one hard error record, are provided. When a cache record of the cache is accessed, error detection data stored in that cache record is used to identify whether an error condition exists or not. If an error condition does exist, then a cache record identifier is stored in an error record of the cache record error storage, and an associated count value is set to a first value. If however a cache record identifier for the currently accessed cache record is already stored in the cache record error storage, then the associated count value is merely adjusted in a first direction (typically incremented) rather than creating any separate entry in the cache record error storage.

If instead no error condition is detected when a cache record is accessed, and an entry for that cache record has already been made in the cache record error storage, then the associated count value is adjusted in a second direction (typically decremented).

Only if the associated count value for a cache record identifier reaches a predetermined threshold value (which may in one embodiment be fixed but in another embodiment may be configurable), is that cache record identifier then identified in the hard error storage. Any cache records whose cache record identifiers are stored in the hard error storage are then logically excluded from further use as part of the cache storage.

Furthermore, on detection of an error condition when accessing a cache record, the contents of that cache record are corrected, and then the access is re-performed. If the error occurred due to a soft error, then the expectation is that when the access is re-performed, no error will be detected and accordingly any change in the state of the cache record error storage that occurred as a result of the error being detected will be reversed when the access is re-performed. However, if the original error resulted from a hard error, then typically the re-performance of the access will also produce an error condition, and this will result in the adjustment of the associated count value in the cache record error storage in the first direction. Thus it will be seen that for a cache record having a hard error, a cache record identifier will be made in the cache record error storage and its associated count value will at some point reach the predetermined threshold value (how quickly this occurs being dependent on the choice of predetermined threshold value), such that the cache record identifier is then promoted into the hard error storage at which point the corresponding cache record is logically excluded from further use as part of the cache storage.

There are a number of ways in which a cache record whose cache record identifier is stored in the hard error storage can be logically excluded from further use as part of the cache storage. In one embodiment, access to that cache record can physically be prevented by the cache control circuitry, whilst in another embodiment the actual cache record may still be physically accessible, but any information derived from access to that cache record will be blocked from being used by the cache control circuitry.

It will be appreciated that various types of access to cache records of the cache storage take place during operation of the data processing apparatus. For example, a cache record may be accessed during the performance of a lookup operation initiated in response to an access request issued by the processing circuitry, may be accessed as part of a linefill operation when seeking to find a candidate cache line for eviction, or may be accessed to perform cache maintenance operations. However, once a cache record has its cache record identifier stored in the hard error storage, and any correction operation initiated in response to detection of the error condition in respect of that cache record has been performed, then that cache record will be logically excluded from the cache storage for the purposes of all subsequent operations of the cache storage. Hence, from that point on, that cache record will be treated as hidden or masked. Thus, when a cache lookup operation is performed in respect of the cache, that cache record will not be involved in the cache lookup procedure. Similarly, when a linefill operation is performed in respect of the cache, that cache record will not be a candidate for the linefill operation.

From the above description, it will be seen that the present invention provides a hardware implementation that automatically identifies hard and soft errors, but only masks the hard error locations from subsequent use by the processing circuitry. Hence, all the benefits of the technique described in the earlier-mentioned commonly assigned co-pending U.S. patent application Ser. No. 12/004,476 are retained, but without soft error locations being masked from use by the processing circuitry. Whilst the approach described in U.S. application Ser. No. 12/004,476 works well in safety critical systems, such as certain automotive systems, where each error (whether hard or soft) must be analysed, the scheme described therein is not optimal in many other less critical applications, for example in networking and application markets without strong safety requirements, since the technique described therein masks both soft and hard errors, and requires an external system to analyse the error and remark a cache record as useable if the error was a soft error. However, the present invention avoids the need for intervention of an external analysis mechanism to analyse the origin of the fault, and hence decreases the cost and complexity of the system, also typically avoiding the need for a dedicated slave port on the cache structure for performing such analysis. Instead, in accordance with the present invention, whilst both soft errors and hard errors are initially detected and recorded in the cache record error storage, only a hard error will cause the predetermined threshold value of the count value to be reached, and the promotion of the corresponding cache record identifier from the cache record error storage to the hard error storage, and only cache records whose cache record identifier is stored in the hard error storage are masked from further use.

Furthermore, the present invention enables the detection of errors to take place at the time the data in the cache is accessed, and provides automatic containment of hard errors through the identification in the hard error storage of any cache records exhibiting hard errors, and the prevention of further use of those cache records. Individual cache records exhibiting hard errors can hence be quickly and efficiently isolated whilst allowing the continued re-use of any cache records exhibiting soft errors.

In one embodiment, the count value is adjusted in said first direction by incrementing said count value, and is adjusted in said second direction by decrementing said count value. In one particular embodiment, the first value to which the count value is set is a logic one value, the predetermined threshold value is at least two, and if the count value is decremented to a logic zero value, the error record storing that logic zero count value is considered to be unallocated. However, it will be appreciated that in an alternative embodiment the predetermined threshold value could be chosen to be a value lower than the first value, and continued occurrence of the error condition could cause decrementing of the count value towards the predetermined threshold value, whilst absence of the error condition could cause incrementing of the count value away from the predetermined threshold value.

Whilst in one embodiment the predetermined threshold value may be fixed, in another embodiment it can be programmable. This, for example, would allow the predetermined threshold value to be tuned to detect as hard errors not only permanent faults, but also intermittent faults.

In one embodiment, if the cache record identifier for said currently accessed cache record is not already stored in the cache record error storage, said error condition is detected on performance of said error detection operation, but no error record in the cache record error storage is available to be allocated to store the cache record identifier for the currently accessed cache record, an event signal is generated to identify that the allocation to the cache record error storage failed. An alternative mechanism would be to employ some eviction mechanism to select an existing error record content to be discarded, in order to free up an error record for storage of a cache record identifier for the currently accessed cache record. However, by not forcibly pushing a cache record identifier into the cache record error storage when the cache record error storage is already full, this ensures that errors do not evict one another and hence avoids some deadlock/livelock situations from arising.

Similarly, in one embodiment, if the associated count value for a cache record identifier stored in the cache record error storage reaches a predetermined threshold value, but no hard error record in the hard error storage is available to store said cache record identifier, an event signal is generated to identify that the store to the hard error storage failed. Typically, if the cache record identifier is stored in the hard error storage, it is removed from the cache record error storage (for example by setting the count value for the relevant error record to zero). However, if the hard error storage is full, and accordingly it is not possible to store the cache record identifier in the hard error storage, then in one embodiment that cache record identifier is retained in an error record of the cache record error storage.

Whilst the cache structure may be a data cache, an instruction cache, or indeed a unified cache, in one embodiment the cache structure is a data cache, and the data values stored therein are data used by the processing circuitry when executing instructions.

The cache storage can be constructed in a variety of ways. However, in one embodiment the cache storage comprises data storage having a plurality of cache lines for storing data values, and address storage having a plurality of entries, each entry identifying for an associated cache line said address indication, and each cache record of the cache storage comprises an entry from the address storage and the associated cache line from the data storage. In one particular embodiment, the address storage is formed of one or more RAM structures referred to as tag RAMs, and the data storage is formed of one more RAM structures referred to as data RAMs.

In one such embodiment the error detection data comprises first error detection data for the entry in the address storage and second error detection data for the associated cache line in the data storage. Hence, when an access to a particular cache record occurs, and an error is detected, that error may be in either the relevant entry in the address storage or in the associated cache line in the data storage. Indeed, in some instances a separate error may be present in both the entry in the address storage and the associated cache line in the data storage.

In one embodiment, the cache record identifier identifies whether the error has been detected in the entry from the address storage or the associated cache line from the data storage. In one particular embodiment, if an error is detected in both the address storage and the data storage for a particular cache record, then two separate error records are populated in the cache record error storage. The same approach can be taken within the hard error storage, but in an alternative embodiment the presence of an error in both the address storage and the data storage for a particular cache record can be indicated within a single hard error record in the hard error storage.

The content of each cache record typically further includes a valid identifier identifying if the cache record's contents are valid, and in one embodiment, for said currently accessed cache record, the error detection circuitry only performs error detection in respect of the data in the associated cache line of the data storage using the second error detection data if the valid identifier is set.

Hence, in such embodiments, if the valid identifier is not set, no error detection operation is performed in respect of the data in the associated cache line of the data storage. However, it should be noted that this relationship between the valid bit and the error detection check on the data is a matter of implementation choice. In the implementation approach above, the cache invalidate operation does not impact the data RAMs, and hence the valid bit is included in the error detection check on the data. This can give rise to power consumption benefits. However, in an alternative embodiment, the cache invalidate operation resets the contents of the data RAM too, and then the valid bit is not included in the error detection check on the data.

The correction operation can take a variety of forms. However, in one embodiment the correction operation comprises a clean and invalidate operation. If the correction operation is applied in respect of a cache line that uses a write back mechanism, and the dirty bit is set, then as part of the clean and invalidate operation it will also be necessary to correct the cache line contents and evict them to a lower level of the memory hierarchy.

However, the correction operation need not be a clean and invalidate operation, and hence, for example, in an alternative embodiment the correction operation may take the form of a write back operation. In accordance with the write back operation, the data is corrected and written back to the cache record, but that cache record is not invalidated, and hence can continue to be used. In such instances, in the event that that cache record ultimately ends up being identified in the hard error storage and hence masked from further use by the processing circuitry, it will then be necessary at that time to evict the data in that cache line and write it back to a lower level of the memory hierarchy to ensure that out-of-date data is not accessed by the processing circuitry.

In one embodiment, the data processing apparatus further comprises cache maintenance circuitry for performing said clean and invalidate operation, and the access to the currently accessed cache record is only re-performed on issuance of a completion signal from the cache maintenance operation identifying that said clean and invalidate operation has completed. This ensures that the clean and invalidate operation has been fully completed before any re-performance of the access takes place.

Since there can be some delay between detection of an error condition and initiation of the corresponding clean and invalidate operation by the cache maintenance circuitry, it is possible that other operations taking place within the cache may have replaced the contents of the relevant cache record in the interim period. For example, a linefill operation may have replaced the contents of that cache record with an entirely new set of content. Accordingly, in one embodiment, the cache maintenance circuitry first checks that the address indication for the currently accessed cache record has not changed since the error condition was detected before performing said clean and invalidate operation. If the contents of the cache record have changed in the interim period then the clean and invalidate operation is no longer required as the content of this location will be checked by subsequent accesses to the cache storage.

In one embodiment, the content of each cache record further includes a valid identifier identifying if the cache record's contents are valid, and the error detection circuitry determines whether the error condition exists even if the valid identifier as stored in the cache record being accessed indicates that the cache record's contents are invalid. Such an approach ensures that even if the valid identifier becomes corrupted due to an error, correct operation can still be ensured when using techniques of embodiments of the present invention.

In one embodiment, when a cache record in the cache storage needs to be selected as an allocated cache record for the storage of data values for access by the processing unit, any cache record whose cache record identifier is stored in the hard error storage is excluded from selection as the allocated cache line. Hence, each cache record identified in the hard error storage is excluded from linefill operations, and accordingly no data will be allocated into that cache record once it is identified in the hard error storage.

The cache storage can take a variety of forms. In one embodiment, the cache storage is an n way set associative cache, and an access performed in response to a request from the processing circuitry is performed in respect of a set in the cache having a cache record in each way of the cache storage. Said cache record identifier identifies the associated cache record by identifying a cache set and a cache way, and on performing an access to a specified set, the error detection circuitry performs error detection for each cache record in the specified set other than any cache record of the specified set identified in the hard error storage. Hence, in such an embodiment, the set and way identifiers are used to identify each cache record in the hard error storage (and indeed the cache record error storage), and the error detection circuitry excludes any such identified cache record from the error detection procedures. Hence, it will be appreciated that in such embodiments any cache record identified in the hard error storage is excluded from the error detection procedure performed by the error detection circuitry, thereby reducing power consumption, and avoiding any further allocations into the cache record error storage in connection with that cache record. Another major benefit is the improved reliability of the system: locations with multiple errors detected thanks to the data pattern (for instance, a three stuck-at 0 fault would be detected with an incoming data value of 001 but not detected with an incoming data value of 111 if the data is protected with a double-error-detection redundant code) are removed from the usage set. If not removed, the location could generate undetectable errors and then malfunctioning or non-correctable ones. Besides, such embodiments of the invention provide error containment because further errors on the same cache location will not impact the behaviour of the system.

In one embodiment, each error record in the cache record error storage, and each hard error record in the hard error storage is arranged to only identify a single cache record. Hence, if multiple errors occurred in multiple ways of a particular set, multiple records would be needed to identify the multiple ways, or some form of arbitration would be needed to determine which way to be identified in the cache record error storage and/or the hard error storage. However, in an alternative embodiment, each hard error record in the hard error storage is able to identify more than one cache way of a particular cache set (for example by providing within the hard error record a bit for each way, each bit being settable to identify that an error has been detected in that associated way), hence allowing such multiple errors to be identified by a single hard error record. However, even when employing such an approach in the hard error storage, it will still typically be the case that separate error records in the cache record error storage will be kept, due to the need to maintain a count value for each particular cache record.

The cache record error storage can be arranged in a variety of ways. In one embodiment, the cache record error storage is formed as a cache, and in one particular embodiment is formed as a fully associative cache where any cache record can be identified in any error record of the cache record error storage. In an alternative embodiment, the cache record error storage may be a direct mapped cache, such that any particular cache record can only be identified in one particular error record. Using a fully associative cache structure provides more flexibility than a direct mapped structure, but also is typically larger than a direct mapped cache structure assuming the same number of records, due to the additional comparators required in a fully associative cache structure. In another embodiment, the cache record error storage may be formed as a set associative cache. The fully-associative implementation will typically allow a better usage of the error records of the cache record error storage.

The comments made above about the variety of ways in which the cache record error storage can be arranged also apply to the hard error storage. In one embodiment, the hard error storage is formed as a fully associative cache.

Viewed from a second aspect, the present invention provides a method of handling hard errors in a data processing apparatus comprising processing circuitry for performing data processing operations, and cache storage having a plurality of cache records for storing data values for access by the processing circuitry when performing said data processing operations, each cache record for storing one or more data values, an associated address indication for said one or more data values, and error detection data, the method comprising the steps of: responsive to a cache record of the cache storage being accessed, performing an error detection operation to determine with reference to the error detection data stored in said cache record whether an error condition exists for said cache record; providing cache record error storage having at least one error record, each error record for storing a cache record identifier identifying a cache record for which said error condition has been detected, and an associated count value; on performance of said error detection operation for a currently accessed cache record, causing said cache record error storage to be accessed to determine whether the cache record identifier for said currently accessed cache record is already stored in the cache record error storage; if the cache record identifier for said currently accessed cache record is already stored in the cache record error storage, then responsive to the error condition being detected on performance of said error detection operation, adjusting said count value associated with that cache record identifier in a first direction, and responsive to the error condition not being detected on performance of said error detection operation, adjusting said count value associated with that cache record identifier in a second direction; if the cache record identifier for said currently accessed cache record is not already stored in the cache record error storage, and said error condition is detected on performance of said error detection operation, allocating one of said at least one error records in the cache record error storage to store the cache record identifier for the currently accessed cache record, and setting the associated count value to a first value; on detection of said error condition when performing said error detection operation, performing a correction operation in respect of the currently accessed cache record, and then re-performing the access to the currently accessed cache record; providing a hard error storage having at least one hard error record; when the associated count value for a cache record identifier stored in the cache record error storage reaches a predetermined threshold value, storing that cache record identifier in one of said at least one hard error records of the hard error storage; and logically excluding any cache record whose cache record identifier is stored in the hard error storage from the plurality of cache records of the cache storage for the purposes of subsequent operation of the cache storage.

Viewed from a third aspect, the present invention provides a data processing apparatus comprising: processing means for performing data processing operations; cache storage means having a plurality of cache record means for storing data values for access by the processing means when performing said data processing operations, each cache record means for storing one or more data values, an associated address indication for said one or more data values, and error detection data; cache control means for controlling access to said cache storage means, said cache control means including error detection means, responsive to a cache record means of the cache storage means being accessed, for performing an error detection operation to determine with reference to the error detection data stored in said cache record means whether an error condition exists for said cache record means; cache record error storage means having at least one error record means, each error record means for storing a cache record identifier identifying a cache record means for which said error condition has been detected, and an associated count value; on performance of said error detection operation for a currently accessed cache record means, the error detection means for causing said cache record error storage means to be accessed to determine whether the cache record identifier for said currently accessed cache record means is already stored in the cache record error storage means; if the cache record identifier for said currently accessed cache record means is already stored in the cache record error storage means, then if the error condition is detected on performance of said error detection operation, said count value associated with that cache record identifier is adjusted in a first direction, and if the error condition is not detected on performance of said error detection operation, said count value associated with that cache record identifier is adjusted in a second direction; if the cache record identifier for said currently accessed cache record means is not already stored in the cache record error storage means, and said error condition is detected on performance of said error detection operation, one of said at least one error record means in the cache record error storage means is allocated to store the cache record identifier for the currently accessed cache record means, and the associated count value is set to a first value; on detection of said error condition when performing said error detection operation, the error detection means further for causing a correction operation to be performed in respect of the currently accessed cache record means, and causing the access to the currently accessed cache record means to be re-performed; the data processing apparatus further comprising a hard error storage means having at least one hard error record means, when the associated count value for a cache record identifier stored in the cache record error storage means reaches a predetermined threshold value, said cache record identifier being stored in one of said at least one hard error record means of the hard error storage means; and any cache record means whose cache record identifier is stored in the hard error storage means being logically excluded from the plurality of cache record means of the cache storage means for the purposes of subsequent operation of the cache storage means.

BRIEF DESCRIPTION OF THE DRAWINGS

The present invention will be described further, by way of example only, with reference to embodiments thereof as illustrated in the accompanying drawings, in which:

FIGS. 7A and 7B illustrate information provided within the ECC error bank and hard error bank, respectively, of FIG. 4 in accordance with one embodiment;

DESCRIPTION OF EMBODIMENTS

Figure 1:
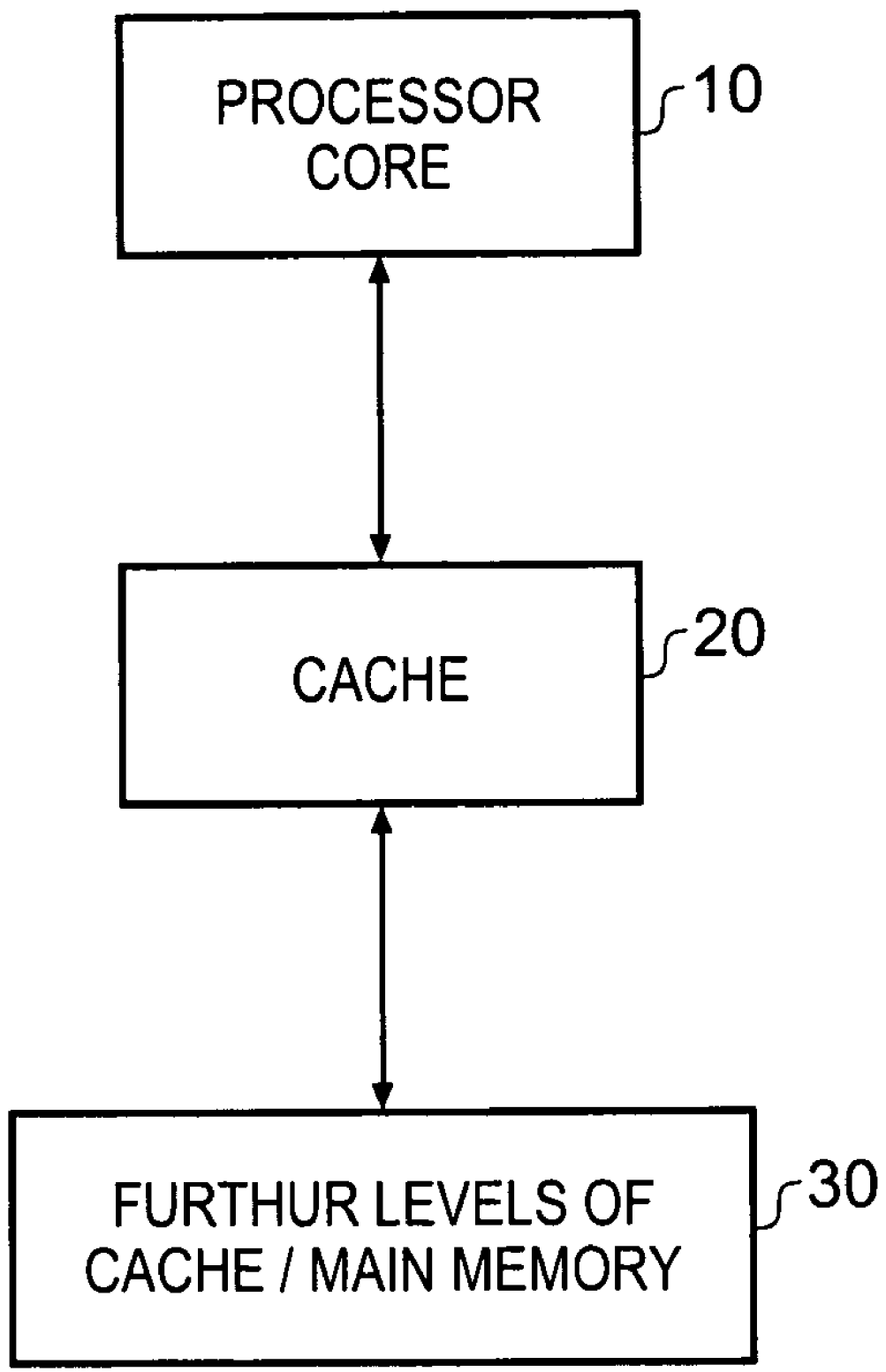
FIG. 1 is a block diagram of a data processing system having a cache in which the techniques of embodiments may be employed.

FIG. 1 is a block diagram schematically illustrating a data processing system in accordance with one embodiment. In this embodiment, a processor core 10 interfaces with a cache 20, which in turn interfaces with one or more further levels of cache within a cache hierarchy, and ultimately with main memory, these further levels of cache and main memory being shown schematically by the block 30. The processor core during operation will issue various access requests seeking to access data values from memory. If those data values are located within the cache 20, they will typically be accessed in the cache avoiding the time penalty of having to access any of the further levels of cache or main memory 30. The cache 20 may be a unified cache provided for instructions and data, or alternatively may be formed as a separate instruction cache for storing instructions for access by the processor core, and a further separate data cache for storing data for access by the processor core. Typically the processor core will only perform read access requests in respect of instructions, but may issue either read or write access requests in association with data. Certain regions of memory may be specified as write through (WT) regions, whilst other regions of memory may be specified as write back (WB) regions of memory. Further, some regions of memory may be specified as cacheable whilst others are specified as non-cacheable.

If the processor core issues a write access request specifying an address which is in a cacheable region of memory, then if a hit occurs within the cache 20, the data the subject of the access request will be updated directly in the cache. If the address relates to a write through region of memory, then an update to memory 30 will also be performed at that time (or at least an entry will be made in a write buffer to ensure that the main memory is updated as soon as possible), but if the access address relates to a write back region of memory, then typically no update will be made at that time in the main memory, and instead a dirty bit associated with the relevant cache line will be set to indicate that the cache line is dirty. When a cache line is later evicted from the cache, if the cache line is valid and the dirty bit is set, then an eviction process takes place to update the stored data values in main memory.

The cache 20 may be arranged in a variety of ways, but for the purposes of discussing an embodiment of the present invention it will be assumed that the cache is an n-way set associative cache. This means that for any particular address specified in an access request, and assuming that address relates to a cacheable region of memory, then a lookup procedure will be performed in the cache for a particular set of the cache, the particular set in question being dependent on the address. Each set will typically include one cache line in each of the ways of the cache.

Whilst in FIG. 1 a processor core 10 is shown by way of example, it will be appreciated that other processing circuitry may also be provided within the data processing system in association with a cache such as cache 20, and hence by way of example in alternative embodiments the processing circuitry may be a digital signal processor (DSP), a hardware accelerator, etc.

Figure 2A:
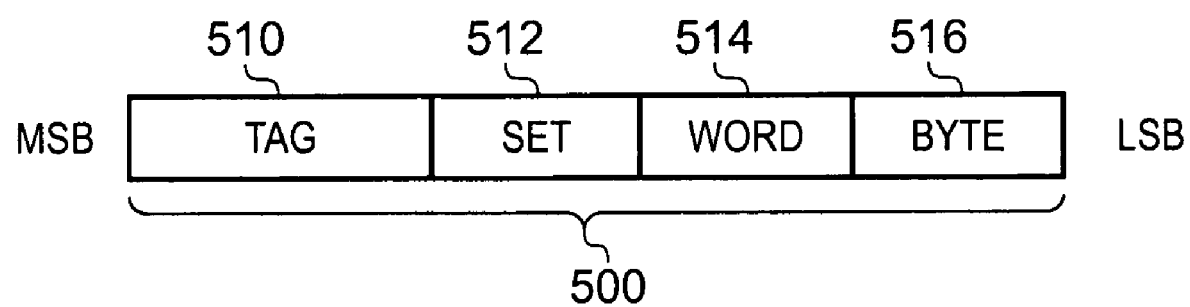
FIG. 2A illustrates the contents of an address output by the processor core of FIG. 1.

FIG. 2A illustrates the contents of an address output by the processor core 10 in association with an access request. The address 500 consists of a tag portion 510, and set, word and byte portions 512, 514, 516, respectively. The set portion 512 of the address 500 is used as an index to identify a particular set within the n-way set associative cache 20. Each of the lines in the set will then have stored in a tag array an associated tag value, which is compared with the tag portion 510 of the address 500 in order to detect whether there is a hit in the set associative cache. The word portion 514 identifies a particular word within the line that is the subject of the access by the processor core, whilst the byte portion 516 allows a particular byte within the word to be specified if required. Note that this scheme could be extended to a bit addressable memory with portion 516 allowing access to a particular bit without altering the essence of the invention.

Figure 2B:
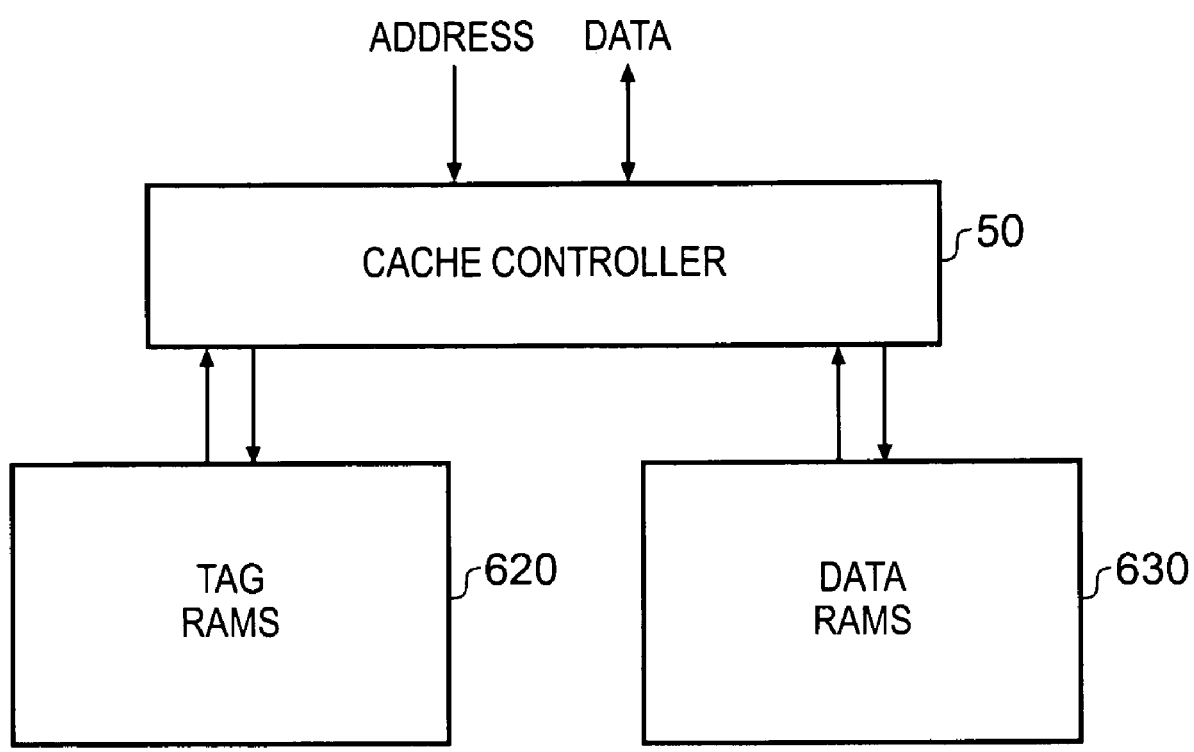
FIG. 2B schematically illustrates the structure of the cache of FIG. 1 in accordance with one embodiment.

FIG. 2B schematically illustrates the main components provided within the cache 20. The cache lines are provided within the data RAMs 630. For each cache line, an entry will be made within the tag RAMs 620, that entry storing the earlier-mentioned tag value, and also typically including certain control bits, such as a valid bit identifying whether the corresponding cache line has valid data stored in it, and a dirty bit indicating whether the data in the associated cache line is more up to date than the data as stored in memory. Accesses to both the tag RAMs 620 and the data RAMs 630 are performed under the control of the cache controller 50, which receives the address of the access request issued by the processor core, and also receives the write data from the processor core in the event of a write access request, or returns in due course the read data to the processor core for a read access request. It will be appreciated that the cache controller 50 will also have connections to and from the next level of memory 30, but for simplicity these are omitted from FIG. 2B.

Figure 3:
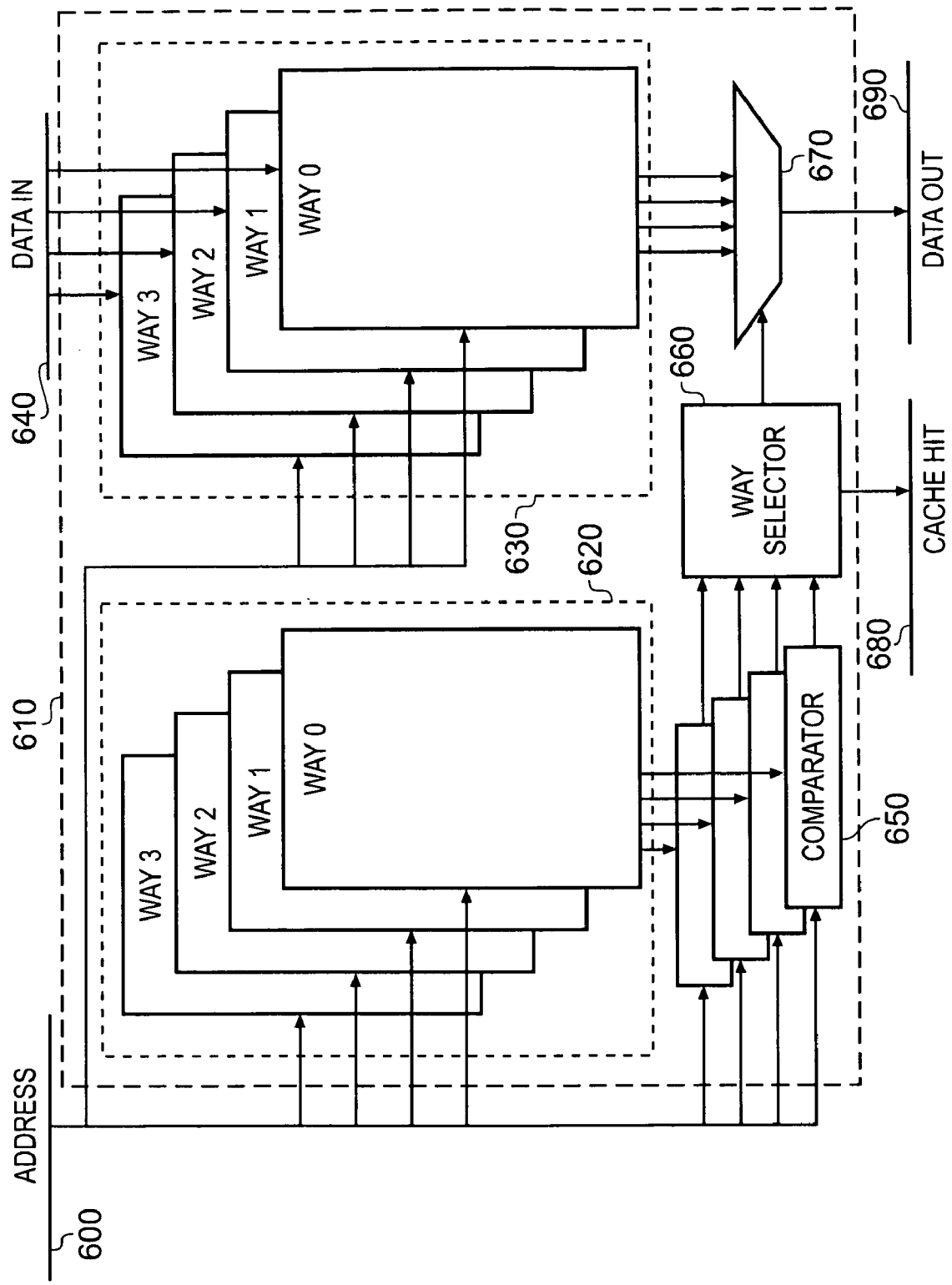
FIG. 3 illustrates in more detail the operation of the cache of FIG. 1 in accordance with one embodiment.

FIG. 3 illustrates in more detail the operation within the n-way set associative cache 20 when a lookup operation for a received access request is performed within the set associative cache 20. In this example the set associative cache 20 is a 4-way set associative cache. The cache comprises four ways, a comparator 650 associated with each way, a way selector 660 and a multiplexer 670. The comparators, way selector and multiplexer will typically be provided within the cache controller 50.

A set of tag RAMs 620 are provided containing a tag RAM memory for each way, and similarly a set of data RAMs 630 are provided comprising a data RAM memory for each way. The data RAM of each way contains a plurality of cache lines that are arranged to store data values. Each set comprises one cache line in each way. Associated with each cache line is an entry in the associated tag RAM in which a tag value is stored.

When a lookup operation is performed, the set portion 512 of the address is routed to each of the tag RAM memories and data RAM memories to identify the cache lines of the relevant set. Within the tag array 620, the tag values for the cache lines identified by the set portion 512 of the address are output to the comparators 650, which also receives the tag portion 510 of the address. Each comparator then compares the tag portion of the address with the tag value received from the corresponding way, and outputs the result of that comparison to the way selector 660. In the event that one of the comparators identifies a match, the way selector outputs a cache hit signal on path 680 to identify to the processor that a hit in the cache has occurred. In the event that no matches are detected by the comparators, the way selector 660 instead outputs a cache miss signal.

Meanwhile, the set portion of the address 512 as routed to the data RAMs 630 causes the relevant cache lines to be accessed within the set. In the event of a read access where a cache hit is detected, the way selector 660 will output a signal to the multiplexer 670 to identify which cache line's data should be output over path 690. The word and byte portions 514, 516 of the address can at this stage be used to identify the particular word or byte to be output.

In the event of a write access which hits in the cache, then if the write access is allowed to proceed the relevant data can be forwarded to the appropriate way of the data RAMs 630 over path 640 for storing in the relevant cache line.

For simplicity, in the above discussion, it is assumed that all of the cache lines contain valid data. If not, this will be indicated by a valid field in the relevant entry in the tag RAMs 620 and any invalid lines would typically be ignored by the comparator circuits 650.

Whilst the above discussion provides a general overview of the operation of a cache, it assumes that the information held in the cache is free from errors. However, as discussed earlier, both hard and soft errors can affect information held within the cache, and accordingly in one embodiment of the present invention an error correction mechanism is provided to seek to enable correct operation of the cache to be maintained even in the presence of hard errors. The mechanism of embodiments of the present invention is based on a "correct-and-retry" scheme. In particular, in one embodiment, if an error is detected within one of the cache lines or associated tag RAM entries subjected to the lookup procedure for an access request, then the relevant cache line is cleaned and invalidated, whereafter the access is re-performed. In one embodiment, the mechanism of embodiments of the present invention supports use with caches that can cache from write back regions of memory, and accordingly in such instances the clean and invalidate operation will require the ability to evict cache lines to memory if they are dirty and valid. To support this, it is not only necessary on evicting a cache line to ensure that the data values in the cache line are corrected if need be before being written to memory, but it is also clearly necessary to make sure that the contents of the relevant tag RAM entry are also correct, in order to ensure that the tag value was correct, and also that the control bits have been interpreted correctly.

In addition to this, when using a correct-and-retry type of scheme, then it is possible that during the retry operation, a linefill operation initiated before the error detection will be performed in respect of the cache, which may result in the retrieved data being allocated to the same way where the hard error was detected, and this will lead to occurrence of the same problem the next time the data is accessed in the cache if the errors in question were due to hard errors.

Figure 4:
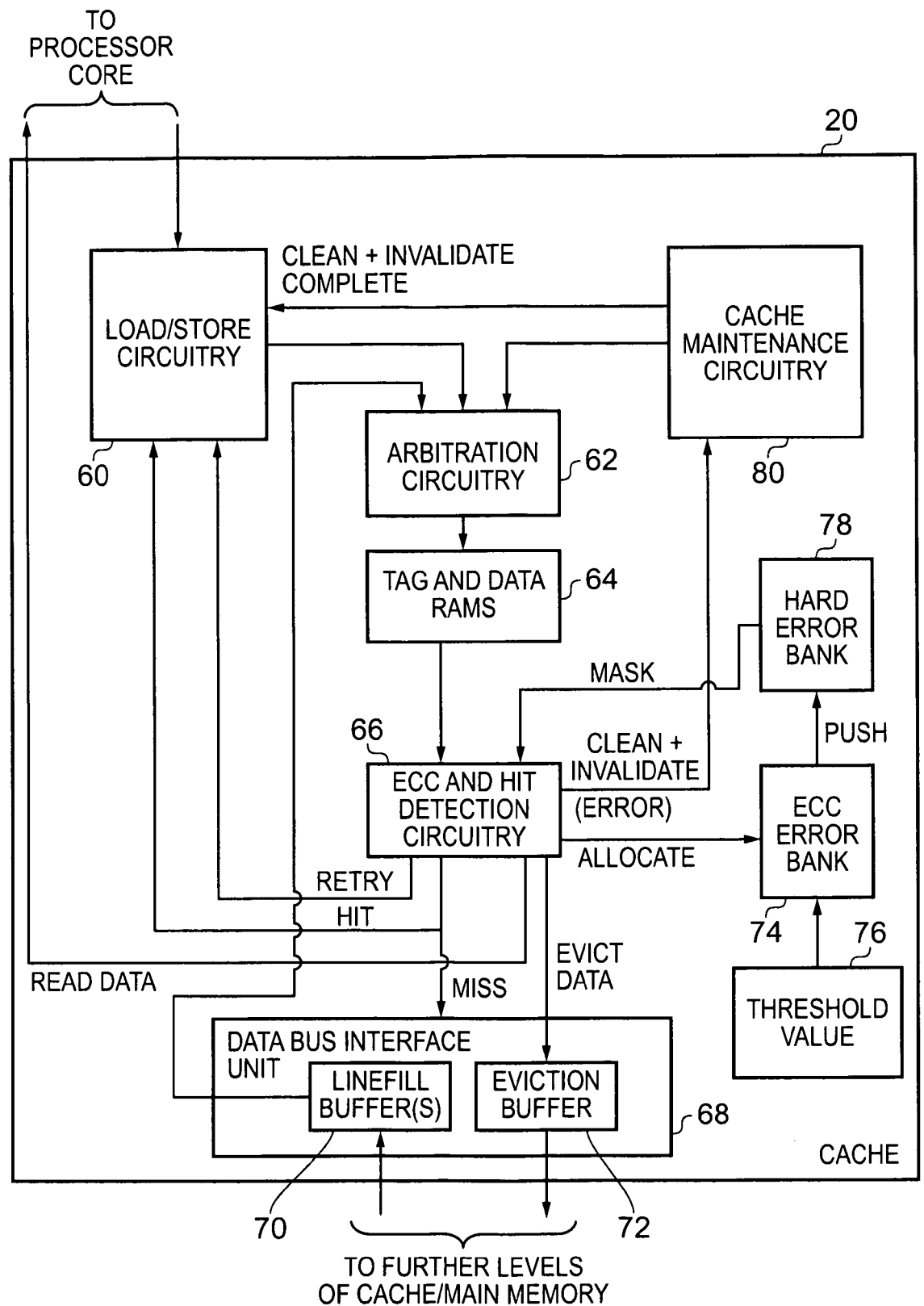
FIG. 4 illustrates in more detail circuitry provided within the cache of FIG. 1 in accordance with one embodiment.

FIG. 4 illustrates components provided within the cache 20 of FIG. 1 in accordance with one embodiment to seek to alleviate these problems. When compared with FIG. 2B, the tag and data RAMs 64 of FIG. 4 correspond with the tag RAMs 620 and data RAMs 630 of FIG. 2B, whilst the other components shown in FIG. 4 collectively implement the cache controller 50 of FIG. 2B. Load/store circuitry 60 is provided within the cache 20 to control the handling of access requests issued by the processor core. In particular, when an access request is received from the processor core, the load/store circuitry 60 will forward that access request to the arbitration circuitry 62, to cause a lookup procedure to be initiated in respect of the tag and data RAMs 64. The arbitration circuitry 62 will perform arbitration with respect to other components also seeking to access the tag and data RAMs 64, in the example of FIG. 4 these components being the cache maintenance circuitry 80 and the linefill buffer(s) 70 and the eviction buffer(s) 72 of the data bus interface unit 68.

When a lookup is performed within the tag and data RAMs 64, the error correction code (ECC) and hit detection circuitry 66 is used to determine whether a hit has been detected in the cache, and also to detect whether any errors have been identified in the accessed cache records (each cache record consisting of a cache line in the data RAMs and a corresponding entry in the tag RAMs). If a hit is detected, and no error is detected, then a hit signal will be returned to the load/store circuitry 60. In the event that the access request is a read access request, the load/store circuitry will then notify the processor core that a hit has occurred, and the required read data will be routed back to the processor core from the ECC and hit detection circuitry 66. In the event of a write access request, the presence of the asserted hit signal will cause the write data provided by the processor core to be written into the relevant cache line of the data RAMs 64 via the arbitration circuitry 62.

If no errors are detected by the ECC and hit detection circuitry 66 when performing a cache lookup in response to an access request issued by the processor core, but a hit condition is not detected, then a cache miss signal will be output to the data bus interface unit 68 to cause a linefill operation to be performed. As part of that process, a cache record within the tag and data RAMs 64 will be identified as a victim cache record whose contents are to be cleaned, and a cache line's worth of data from the further levels of cache/main memory will be retrieved into a linefill buffer 70 for writing into that victim cache record via the arbitration circuitry 62. In the event that that victim cache record contains valid and dirty data, then the data will be evicted via the eviction buffer 72 to the further levels of cache/main memory.

If, when performing an access to the tag and data RAMs 64, an error is detected by the ECC and hit detection circuitry 66, the hit signal is ignored by the load/store circuitry 60, and instead a retry signal will be asserted to the load/store circuitry, and a corresponding clean and invalidate signal will be issued from the ECC and hit detection circuitry 66 to the cache maintenance circuitry 80. Further, an allocate signal will be issued to the ECC error bank 74.

The asserted retry signal will cause the load/store circuitry 60 to retry the access once a clean and invalidate complete signal has been received from the cache maintenance circuitry 80. The cache maintenance circuitry is responsive to the clean and invalidate signal issued by the ECC and hit detection circuitry 66, to perform a clean and invalidate operation in respect of a cache record for which the error was detected. Typically, side band signals (not shown in FIG. 4) will be issued from the ECC and hit detection circuitry 66, providing index and way values identifying a particular cache record where an error has been detected. Further, in one embodiment those side band signals will also identify the location where the error occurred, in particular whether the error occurred in the tag RAM entry or the data RAM cache line of the identified cache record. The cache maintenance operation performed by the cache maintenance circuitry involves performing a clean and invalidate operation in respect of a cache record for which an error has been detected. Hence, the cache record is first corrected using error code data included within the relevant tag RAM entry and data cache line, and then that cache record is invalidated. If it is determined following correction that the cache record contains dirty data, then this clean and invalidate operation will also involve the eviction of the data corrected via the eviction buffer 72 to the further levels of cache/main memory. Once the clean and invalidate operation has been completed, the clean and invalidate complete signal will be issued to the load/store circuitry 60.

The allocate signal issued by the ECC and hit detection circuitry 66 on detection of an error will cause an error record to be allocated in the ECC error bank 74 to identify the cache record for which an error has been detected. In the event that more than one cache record is identified as being in error during the access to the tag and data RAMs 64, then in one embodiment a separate error record will be allocated in the ECC error bank 74 for each of those cache records. FIG. 7A illustrates the information provided within each error record 250 of the ECC error bank 74. In particular, as shown, the index and way values identifying the cache record are stored within the error record, along with error location information identifying whether the error occurred in the tag RAM entry or the data RAM cache line of the relevant cache record. Further, a counter value is set. When an error record is first allocated for a particular cache record, then the counter is set to a logic one value. Each time an error is again detected for that cache record, then instead of allocating a further error record in the ECC error bank, the same error record will be retained but the counter will be incremented. Each time an error detection process is performed for that cache record and an error is not detected, then the counter is decremented.

If the counter reaches a threshold value, which as shown in FIG. 4 can be programmed into a threshold value storage element 76 accessible to the ECC error bank 74, then the error record is pushed from the ECC error bank to a hard error bank 78, the contents of the hard error bank being shown schematically in FIG. 7B. In particular, each hard error record 260 in the hard error bank again stores the index and way information identifying the particular cache record, and also stores the error location information. Further, once the hard error record is allocated to store these details for a particular cache record, then the valid bit is set to identify that that hard error record is valid.

Once a cache record is identified in a hard error record of the hard error bank 78, then that cache record is masked from the subsequent operations of the ECC and hit detection circuitry 66. As a result, whenever the tag and data RAMs 64 are subsequently accessed, any cache record identified in the hard error bank is effectively excluded from that access, as a result of which a hit will never be detected in that cache record, and no further error correction processes will be performed in respect of that cache record.

All actions are allowed to continue following the allocation of a cache record: if these actions see errors, they will wait for the completion of the correction. By construction of the system, the mask ensures in the ECC and hit detection circuitry that the line is not further seen nor used. Once the system can handle the clean and invalidate signal issued by the ECC and hit detection circuitry 66 in respect of that cache record, the clean and invalidate operation is performed to ensure that any valid and dirty data is correctly evicted to the further levels of cache/main memory before that cache record is masked from further use.

By using the combination of ECC error bank 74 and hard error bank 78, it can be ensured that only cache records exhibiting hard errors are masked from further use. In particular, it will be appreciated that when an error is first detected for a cache record, and accordingly an entry is initially made in the ECC error bank 74, then if that error is a soft error, the clean and invalidate operation performed by the cache maintenance circuitry will correct and invalidate the data. When the access is then retried, a miss will be detected and a linefill operation will be performed. It is possible that the data retrieved will be allocated back into the same cache record, and when this is next accessed no error will be detected, and accordingly the count value in the ECC error bank for that cache record will be decremented back to zero, at which point the cache record is considered no longer to be allocated in the ECC error bank. Only if an error persists after having been cleaned and invalidated will the count value of any cache record identified in the ECC error bank continue to be incremented, and the threshold value can be chosen such that once that threshold value has been reached it can be assumed that the error is in fact a hard error. At that point, a cache record identifier for the offending cache record is then pushed into the hard error bank, after which further use of that cache record is prevented.

Accordingly, such an approach provides a simple and effective hardware mechanism for identifying and correcting both soft and hard errors as accesses are performed, and for blocking from further use any cache records in which hard errors are detected.

Once the valid bit has been set in a hard error record, it will in one embodiment remain set until some external analysis is performed in order to determine whether the identified cache record truly has a hard error. If as a result of that analysis it is decided that a hard error is not present, then the valid bit can be cleared in order to free up the hard error record for future allocation to another cache record identifier.

In one embodiment, the threshold value used to determine when to promote a cache record identifier to the hard error bank is set to 5, and the cache is a four way set associative cache. By setting the value to 5, this then allows for the worst case scenario, where an access using a particular index causes an error to be detected in all four ways. Detection of an error in all four ways will cause the allocation of four separate error records in the ECC error bank 74, with all of their counters being set to a logic one value. The cache maintenance circuitry will then perform a clean and invalidate operation in respect of one of the cache records for which an error was detected. When the access is then retried, and assuming the error was a soft error, this will now cause only three errors to be detected. Whilst this will cause the counter in one of the cache records to be decremented back to zero due to the error no longer being detected, for the other three it will cause the counter to be incremented to 2, and a clean and invalidate operation, followed by a retry operation, will be performed again. In the worst case scenario, it can be seen that it will take four iterations for all of the erroneous cache records to be cleaned and invalidated, by which time at least one of the error record entries in the ECC error bank will have had its counter incremented to 4. If any soft errors have been detected, then from that point on the count values should begin to be decremented each time the relevant cache record is accessed. However, if the error is a hard error, then the next time that cache record is accessed, an error will also be detected, and this time the count value will be incremented to 5, thereby causing the identification of that cache record to be pushed into the hard error bank 78.

However, it will be appreciated that there is no requirement for the threshold value to be set to 5, nor indeed for the technique to be used only in association with a four way set associative cache. More generally, the threshold value 76 can be programmed to any desired value, and can be tuned to detect desired types of hard errors. For example, it could be set to a value seeking to detect as hard errors not only permanent faults but also intermittent faults.

Furthermore, the number of error records provided within the ECC error bank 74 and the number of hard error records provided within the hard error bank 78 is a matter of design choice. In the examples of FIGS. 7A and 7B, there are four error records in the ECC error bank 74 and two hard error records in the hard error bank 78, but in an alternative embodiment there could be, for example, eight error records in the ECC error bank, and, for example, four hard error records in the hard error bank.

Further, in FIGS. 7A and 7B it is assumed that the way field in each of the error records and hard error records has a bit per way encoding. In the error record, this encoding identifies only a single way per record whereas different way bits of a record can be asserted in the hard error record. However, it is not essential that such encodings are used, and the way information may be identified in any appropriate manner. Further, at least with regard to the hard error bank, it is possible that errors in multiple ways having the same index could be identified by a single hard error record, thereby enabling multiple cache records to be masked from further use by a single hard error record. However, such an approach will not typically be used for the error records in the ECC error bank, due to the need to retain a counter for each error record. It will generally be appropriate to keep a separate counter for each cache record that is identified in the ECC error bank.

Figure 5:
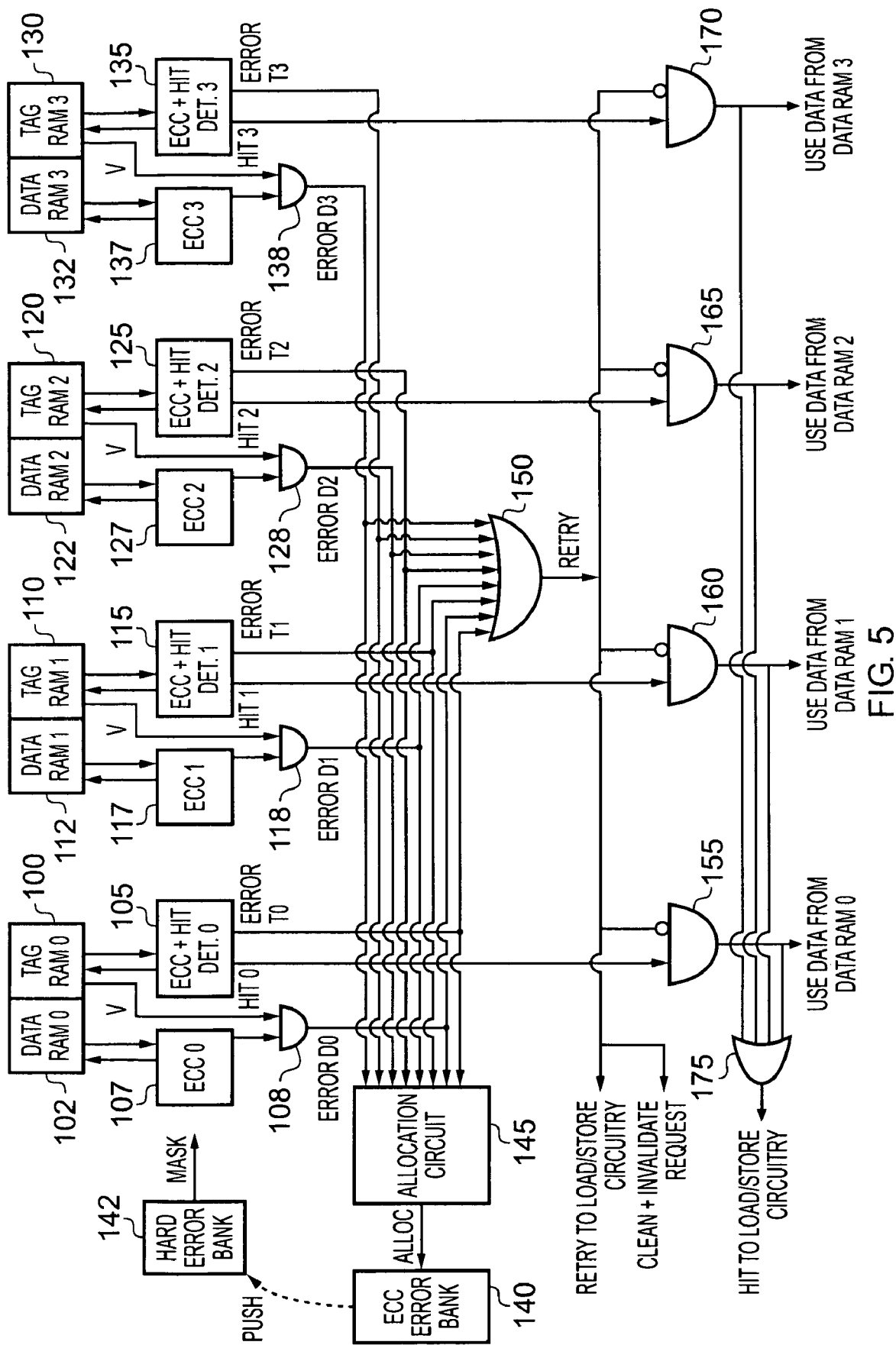
FIG. 5 illustrates in more detail components provided within the ECC and hit detection circuitry of FIG. 4 in accordance with one embodiment.

FIG. 5 illustrates in more detail the operation of the ECC and hit detection circuitry 66 of FIG. 4.

As shown in FIG. 5, error correction code and hit detection components 105, 115, 125, 135 are provided in association with each tag RAM 100, 110, 120, 130, one tag RAM being provided for each way of the set associative cache. Each tag RAM entry stores, in addition to the usual tag value, valid and dirty bits, and error correction code data (referred to herein as error data), which is redundant data used to detect the presence of an error in the contents of the tag entry. It will be appreciated that whilst each tag RAM is shown as a single RAM structure, there is no requirement for the tag, valid, dirty and error data values to reside in a single physical RAM and alternatively they may be provided in separate physical RAMs.

On receipt of an access request specifying a cacheable memory address, a lookup procedure is performed by the components 105, 115, 125, 135 in the respective tag RAMs 100, 110, 120, 130. In particular, using the general mechanism discussed earlier with reference to FIG. 3, one of the entries in each tag RAM is identified, and its contents returned to the hit detection circuits. In addition to seeking to detect the presence of a cache hit, each component 105, 115, 125, 135 also performs error correction code processing using the error data provided in the entry in order to seek to detect the presence of an error. As a result, each component 105, 115, 125, 135 outputs a hit signal identifying whether a hit has been detected or not and an error signal indicating whether an error has been detected or not. If the hit signal is set, this indicates a hit, and if the error signal is set, this indicates detection of an error. For the purposes of the present discussion, it will be assumed that a set condition is indicated by a logic 1 level.

All of the error signals are routed to the OR gate 150, which will output a retry signal at a set level if any of the error signals are set. This retry signal will be issued to the load/store circuitry 60 as discussed earlier in FIG. 4. Hence, it can be seen that in accordance with the embodiment shown, if an error occurs in any of the tag RAM entries subjected to the lookup procedure, whether a hit was detected in that tag RAM entry or not, a retry mechanism is instigated.

The output from the OR gate 150 also forms a clean and invalidate request signal issued to the cache maintenance circuitry 80 as discussed earlier with reference to FIG. 4.

Further, whenever an error signal is detected, this triggers the allocate circuit 145 to allocate an entry in the ECC error bank 140.

As also shown in FIG. 5, an inverted version of the retry signal is used as a qualifying signal to the hit signals issued by the various components 105, 115, 125, 135. In particular, the AND gates 155, 160, 165, 170 ensure that any hit signal output by the associated components 105, 115, 125, 135 is only propagated on to the way selector and multiplexer circuitry 660, 670 of FIG. 3 if the retry signal is not set. Hence, in the absence of a set retry signal, a hit signal issued by one of the components can then be used to cause the data values in the corresponding cache line to be accessed. Further, the OR gate 175 is used to generate a hit signal back to the load/store circuitry 60 in the event that any of the outputs of the AND gates 155, 160, 165, 170 are set. For frequency issues, the hit signal back to the load/store circuitry can be simply generated as hit0 AND NOT error0 OR hit1 AND NOT error1 OR hit2 AND NOT error2 OR . . . .

As also shown in FIG. 5, similar error correction code components 107, 117, 127, 137 can be provided in association with the corresponding data RAMs 102, 112, 122, 132. As with the tag RAM entries, each cache line will typically include error data which can be used to detect the presence of an error in the cache line's contents, and each of the ECC components 107, 117, 127, 137 will then assert a set error signal if such an error is detected. However, that error signal is gated by the valid bit from the relevant tag RAM entry, so that in effect error correction of the cache line's contents is only performed if the cache record has valid contents. Thus, the AND gates 108, 118, 128, 138 make sure that any error signal detected by the components 107, 117, 127, 137 is only propagated onto the allocation circuit 145 and the OR gate 150 if the valid bit of the corresponding tag entry is set.

As described earlier with reference to FIG. 4, once a count value for a particular cache record identified in the ECC error bank 140 reaches a predetermined threshold, the identifier for that cache record is pushed into the hard error bank 142. Any cache records identified in the hard error bank 142 are masked from the operations performed by the error correction and hit detection components 107, 105, 117, 115, 127, 125, 137, 135.

Figure 6:
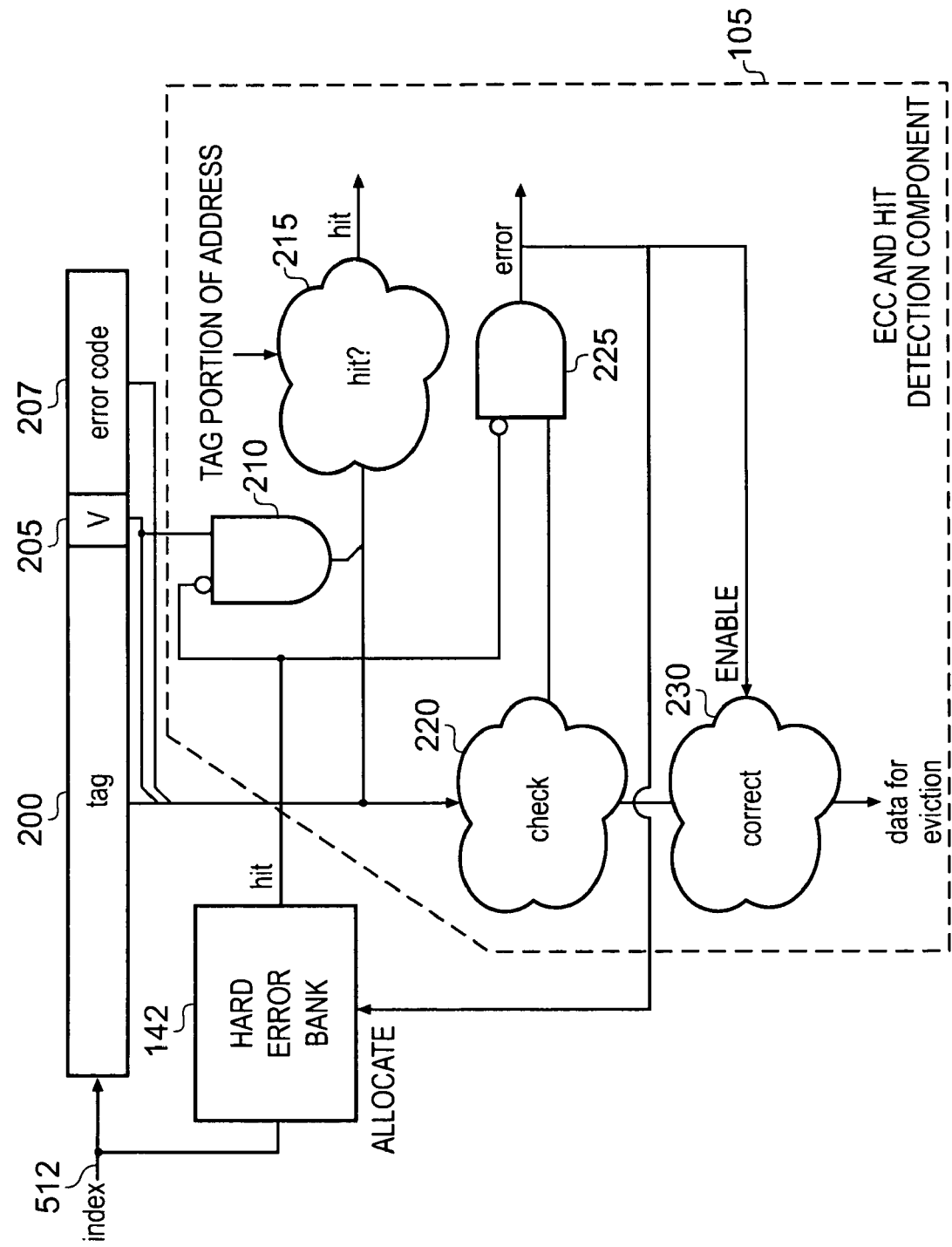
FIG. 6 illustrates in more detail the elements provided within each error correction code and hit detection component shown in FIG. 5 in association with each TAG RAM, in accordance with one embodiment.

FIG. 6 illustrates in more detail the components provided within each error correction code and hit detection component 105, 115, 125, 135 of FIG. 5. In particular, the error correction code and hit detection circuitry 105 is shown, but each of the other circuits 115, 125, 135 is constructed in the same way.

As shown, the set or index portion 512 of the address is used to identify a particular entry in the tag RAM, that entry including a tag value 200, a valid bit 205 and some error code bits 207. As mentioned earlier, there may also be a dirty bit value in the entry, but that has been omitted for clarity in this diagram. The index portion of the address is also input to the hard error bank 142 to determine whether there is a record in the hard error bank which matches the specified index. Hence, if the index of the address matches the index (i.e. set) identifier in the hard error bank, then a location avoid hit signal will be output to the error correction code and hit detection component associated with the way identifier in that same record of the hard error bank 142.

If the location avoid hit signal is set at the output of the hard error bank, then it can be seen that this will cause the AND gates 210, 225 to output a logic zero value irrespective of their other input. In particular, if a logic zero value is output from the AND gate 210, this will indicate to the hit detection circuitry 215 that the cache line in question is invalid, and accordingly no cache line hit signal will be generated. Further, if the location avoid hit signal is set, this will cause the AND gate 225 not to output a set error signal irrespective of any error check performed by the error check circuitry 220. Hence, in the presence of a hit in the hard error bank 142, the error correction code circuitry 220 and hit detection circuitry 215 for the relevant way will identify no error and will issue a miss signal, thereby ensuring correct operation of the cache even in the presence of a hard error in the relevant cache record. In particular, assuming the data value which is the subject of the access request is not found in any of the other ways of the cache, and no other errors are detected, this will cause a cache miss operation to be invoked, as a result of which the required data value will be accessed from a lower level of the cache hierarchy or from main memory. Further, if a linefill operation is performed as part of that cache miss procedure, the hit indication from the hard error bank will also avoid the associated cache line being chosen as the allocated cache line for that linefill procedure, and instead a victim cache line will be chosen from one of the other ways if available. This avoids one potential problem that can arise when using a correct and retry scheme, namely that the affected data could be flushed from the cache only to be re-retrieved into the same location in the cache during the subsequent linefill operation, leading to reoccurrence of the problem the next time the data is sought to be accessed. Instead, through use of the hard error bank, it will be ensured that the data retrieved as part of the retry operation will, if allocated into the cache, be allocated to a different cache line.

As is apparent from FIG. 6, if there is not a hit in the hard error bank, then an error check operation is performed by the circuit 220, and if an error is detected that error is output from the AND gate 225. In the event of a set error signal, this will cause correction circuit 230 to be enabled to correct the error, and then a clean and invalidate operation will be performed (in the earlier described embodiment the correction circuit can be considered to be part of the cache maintenance circuitry 80). For a write back region whose cache line content is dirty, this will involve eviction of the data from the cache line as well as invalidation of the cache line following eviction. Further, if the error signal is set, this will cause an allocation operation to be performed to allocate a record in the ECC error bank 140 to identify the set and way information for the cache record in question.

In the absence of a hard error bank hit, and assuming no error is generated, then it will be seen that the hit logic 215 operates in the usual manner and will generate a set hit signal if the valid bit 205 is set, and the tag value 200 matches the tag portion of the address.

Whilst FIG. 6 illustrates in detail the operation of the ECC and hit detection components 105, 115, 125, 135, it will be appreciated that the corresponding ECC components 107, 117, 127, 137 for the data RAMs operate in a similar manner. In particular, only the components 210 and 215 are omitted, and the check circuit 220 checks the data in the cache line using associated error code information. Any error signal produced by the AND gate 225 is then gated by the valid signal from the appropriate tag RAM entry, as discussed earlier with reference to FIG. 5.

Figure 8:
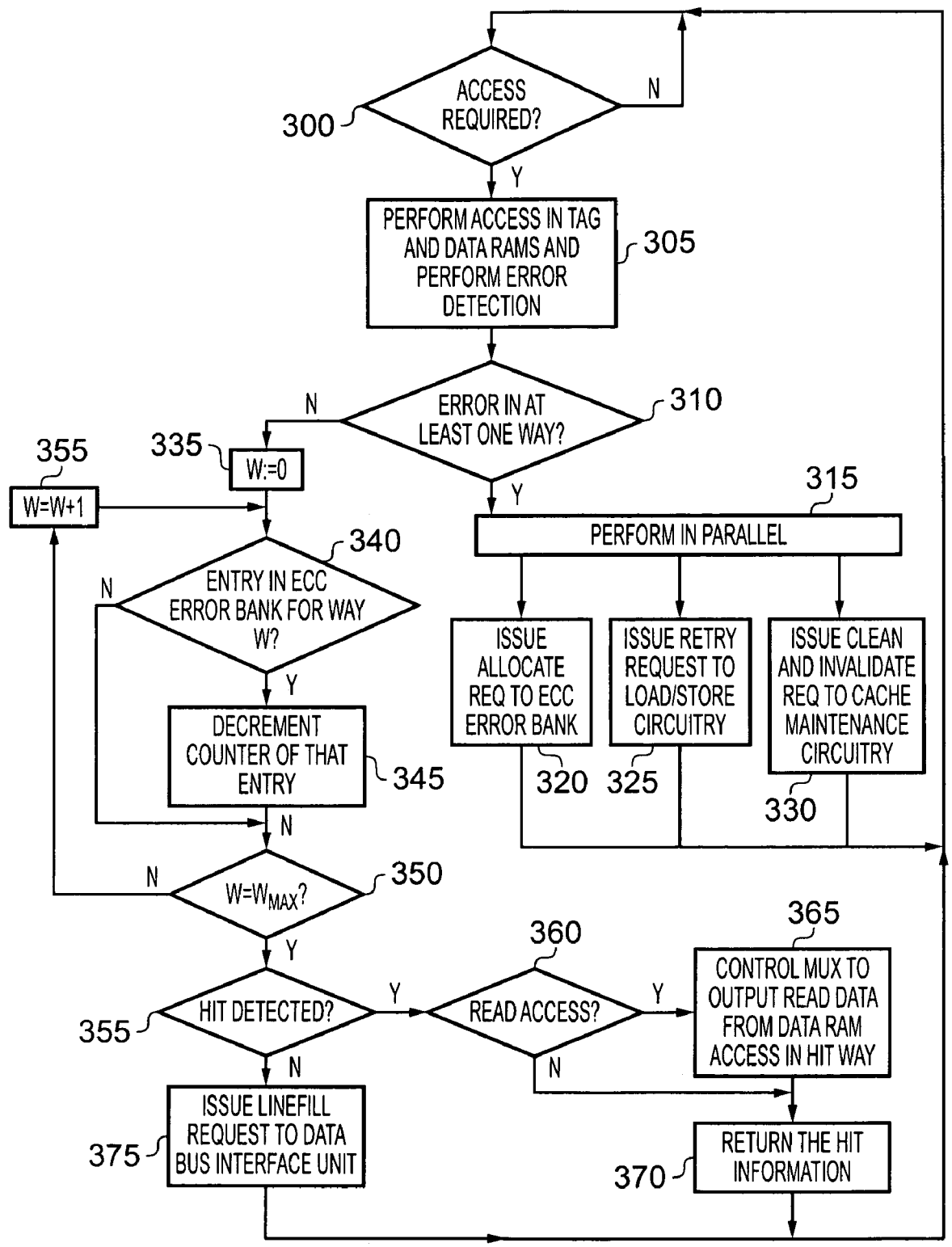
FIG. 8 is a flow diagram illustrating the steps performed by the cache of FIG. 4 when processing an access to the cache in accordance with one embodiment.

FIG. 8 is a flow diagram illustrating the steps performed by the cache 20 of FIG. 4 when processing an access to the cache in accordance with one embodiment. At step 300, it is determined whether an access to the cache is required. It will be appreciated that a number of events may cause an access to be required. For example, an access request issued by the processor core may require the cache to be accessed to perform a cache lookup operation in all the ways of the cache, or an access to a particular way may be initiated, for example by the cache maintenance circuitry when performing a cache maintenance operation. Once it is determined at step 300 that an access is required, then at step 305 an access is performed in the required tag and data RAMs, and error detection is performed. As is apparent from the earlier discussion of FIG. 5, error detection is only performed in respect of a data RAM if the valid bit in the corresponding tag RAM entry is set.

At step 310, it is determined whether an error in at least one accessed way has been detected, and if it has, then a parallel process is initiated at step 315. In particular, an allocate request is issued to the ECC error bank 74 at step 320, a retry request is issued to the load/store circuitry 60 at step 325, and a clean and invalidate request is issued to the cache maintenance circuitry 80 at step 330. More details of the operations performed at steps 320, 325 and 330 will be discussed later with reference to the flow diagrams of FIGS. 10, 12 and 13.

Assuming no error is detected in the tag and data RAMs that were subjected to the error detection process, then the process proceeds to step 335, where a parameter w is set equal to zero. At step 340, it is determined whether there is an entry in the ECC error bank for way w. If there is an entry in the ECC error bank for way w, then the process proceeds to step 345, where the counter for that entry is decremented. However, as discussed earlier with reference to FIG. 7A, each entry in the ECC error bank also identifies the error location, i.e. whether the error was detected in the tag RAM or the data RAM, and accordingly any decrementing at step 345 is only performed if the relevant tag or data RAM was subjected to an error detection process at step 305. As a particular example of when decrementing would not be appropriate, as discussed earlier with reference to FIG. 5, performance of error detection processing in respect of data RAM contents is only performed if the valid bit in the corresponding tag RAM is set. Accordingly, for a particular cache record, there can be instances where the data RAM contents are not subjected to error detection at step 305. In that instance, if the entry for that cache record in the ECC error bank related to an error detected in the data RAM, then no decrementing of the counter would take place at step 345.

Following step 345, or assuming there is no entry in the ECC error bank for way w at step 340, then the process proceeds to step 350, where it is determined whether w is equal to a value $w_{max}$. For a four way set associative cache, $w_{max}$ will be set equal to 3. Assuming w is not equal to $w_{max}$, then the process returns to step 340 via step 355, at step 355 the value of w being incremented by 1. Accordingly, it will be seen that by the time it is determined at step 350 that w is equal to $w_{max}$, then steps 340 and 345 will have been performed in respect of each way of the cache, whereafter the process proceeds to step 355.

It will be appreciated that the full set of steps 335 to 355 only need to be performed for each way when a full cache lookup has taken place. In the event that a more focused access to a particular way took place at step 305, then an equivalent set of steps can be implemented to ensure that only entries in the ECC error bank relating to the way subjected to the access and the actual RAM(s) subjected to error detection have their counter decremented.

In a further alternative embodiment, instead of performing the steps 335, 340, 345, 350 and 355, it can instead be arranged to only decrement counters in respect of entries where a hit condition has been detected when performing the lookup at step 305.

At step 355, it is determined whether a hit was detected during the access procedure performed at step 305. If it was, then the process proceeds to step 360, where it is determined whether the access was a read access or a write access. If the access was a read access, the process proceeds to step 365, where the multiplexer 670 is used to output the read data from the data RAM access performed in respect of the hit way, and at step 370 the hit information is output by the way selector 660. If the access was instead a write access, the process proceeds directly from step 360 to step 370. When the load/store circuitry 60 receives the hit information for a write access, it will then initiate a further access to write the required data into the relevant data RAM cache line.

If at step 355 a hit is not detected, then the process proceeds to step 375, where a linefill request is issued to the data bus interface unit 68.

Figure 9:
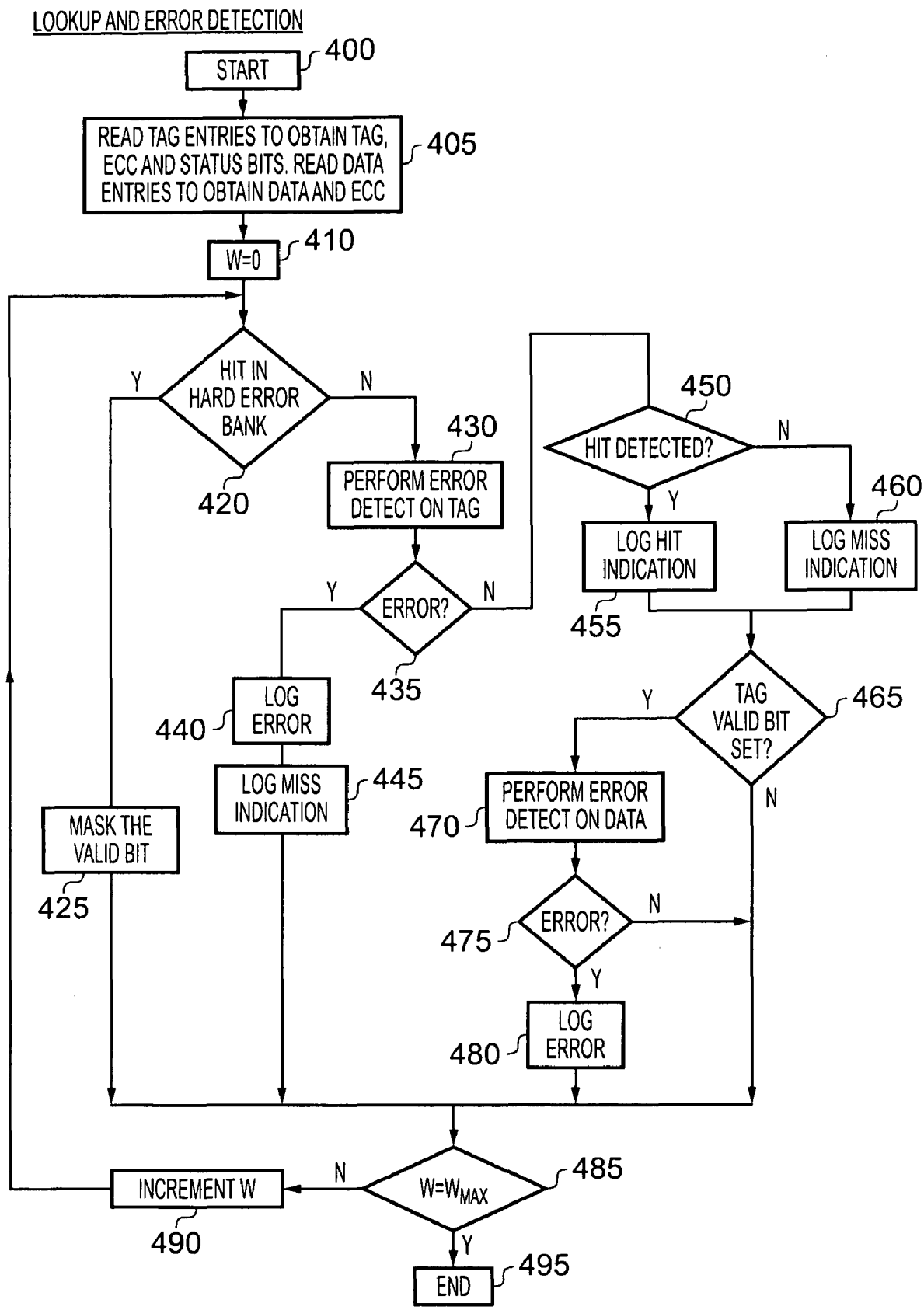
FIG. 9 is a flow diagram illustrating in more detail how the access and error detection step of FIG. 8 is performed in the event the access requires a full lookup operation, in accordance with one embodiment.

FIG. 9 is a flow diagram illustrating the steps performed to implement step 305 of FIG. 8 in accordance with one embodiment, in the event that a full cache lookup operation is performed. At step 400, the process starts, whereafter the tag entries for the relevant set are read to obtain the tag value, ECC data, and status bits (valid, dirty bits, etc), and the cache lines for the relevant set are read to obtain the data and associated ECC data. Thereafter at step 410, the parameter w is set equal to zero.

At step 420, the hard error bank 78 is checked in order to determine whether a hit in the hard error bank has been detected, and if so the valid bit from the corresponding tag entry for way w is masked at step 425.

Assuming no hit is detected in the hard error bank, then at step 430 error detection is performed on the tag value from the tag entry for way w, whereafter at step 435 it is determined whether an error has been detected. If it has, then the error is logged at step 440, and a miss indication is also logged at step 445. The order of these steps does not matter.

If no error is detected at step 435, it is then determined at step 450 whether a hit has been detected for way w. If it has, then a hit indication is logged at step 455, whereas otherwise a miss indication is logged at step 460.

At step 465, it is determined whether the tag valid bit is set, and if it is not no further action is required in respect of way w, since the corresponding cache line does not need to be subjected to error detection. However, assuming the tag valid bit is set, then an error detection operation is performed in respect of the data at step 470, whereafter at step 475 it is determined whether an error has been detected. If it has, then the error is logged at step 480, whereas otherwise the process branches to step 485.

As shown in FIG. 9, following steps 425, 445, 480, or the no branch of step 465, the process proceeds to step 485, where it is determined whether w is equal to the value $w_{max}$. If not, then the value of w is incremented at step 490, and the process returns to step 420. However, if the value of w is set equal to $w_{max}$, then the process ends at step 495.

If, instead of a full cache lookup operation, an access to a particular way were performed at step 305 of FIG. 8, it will be appreciated that steps 410, 485 and 490 can be omitted, and instead the process of FIG. 9 will only be performed in respect of the accessed way.

Figure 10:
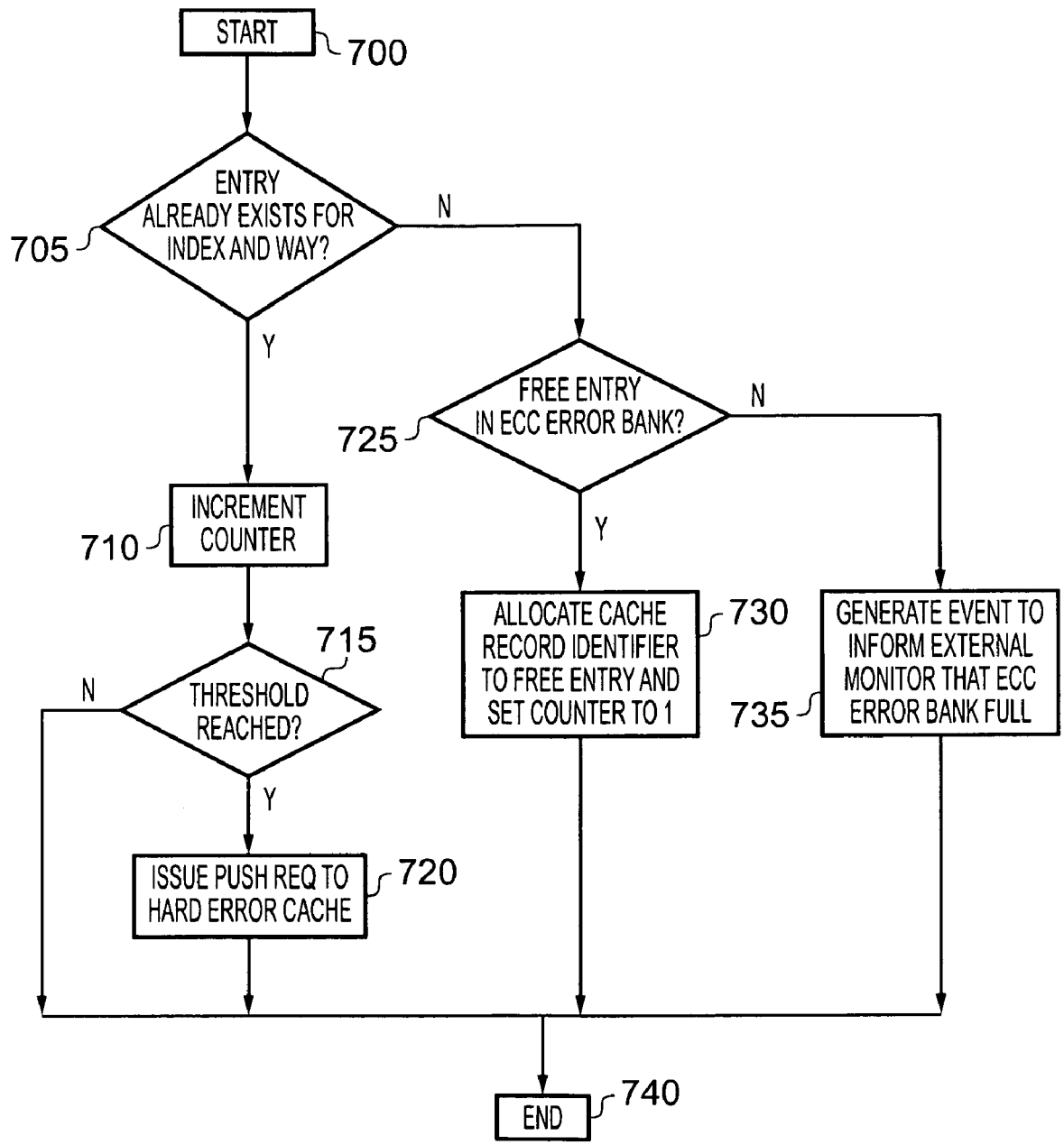
FIG. 10 is a flow diagram illustrating how the allocate request issued in FIG. 8 is processed in accordance with one embodiment of the present invention.

FIG. 10 is a flow diagram illustrating how the allocate request is processed by the ECC error bank 74 in accordance with one embodiment. At step 700, the process starts, whereafter at step 705, it is determined whether an error record entry already exists for the index and way identified as side band signals with the allocate request. If such an entry does already exist, then the counter is merely incremented at step 710 for that entry. Thereafter, at step 715, it is determined whether the threshold value has been reached, and if not the process ends at step 740. However, if the threshold value has now been reached, then the process proceeds from step 715 to step 720, where a push request is issued to the hard error cache 78.

Assuming it is determined that an error record entry does not already exist at step 705 for the relevant index and way, then it is determined at step 725 whether there is a free entry in the ECC error bank. If there is, then a cache record identifier is allocated to the free entry and its counter is set to one at step 730. As discussed earlier with reference to FIG. 7A, the cache record identifier will typically include index, way and error location identifier information, thereby identifying a specific cache record where the error occurred, and identifying whether the error occurred in the tag RAM or data RAM of that cache record.

If no free entry is determined to exist at step 725, then an event is generated at step 735 to inform an external monitor that the ECC error bank is full.

It will be appreciated that such an event could then be handled in a variety of ways. For example, at a convenient point, a user of the apparatus could run some analysis procedures to analyse the contents of the ECC error bank and perform some checks on the cache records identified by the ECC error bank in order to determine whether those cache records are exhibiting only soft errors, or are exhibiting hard errors. For any cache records where only soft errors are being detected, the relevant entries in the ECC error bank can be cleared by resetting their counter to zero, thereby freeing those entries up for future allocation to subsequently detected errors.

Following steps 720, 730, 735, or the no path from step 715, the process ends at step 740.

Figure 11:
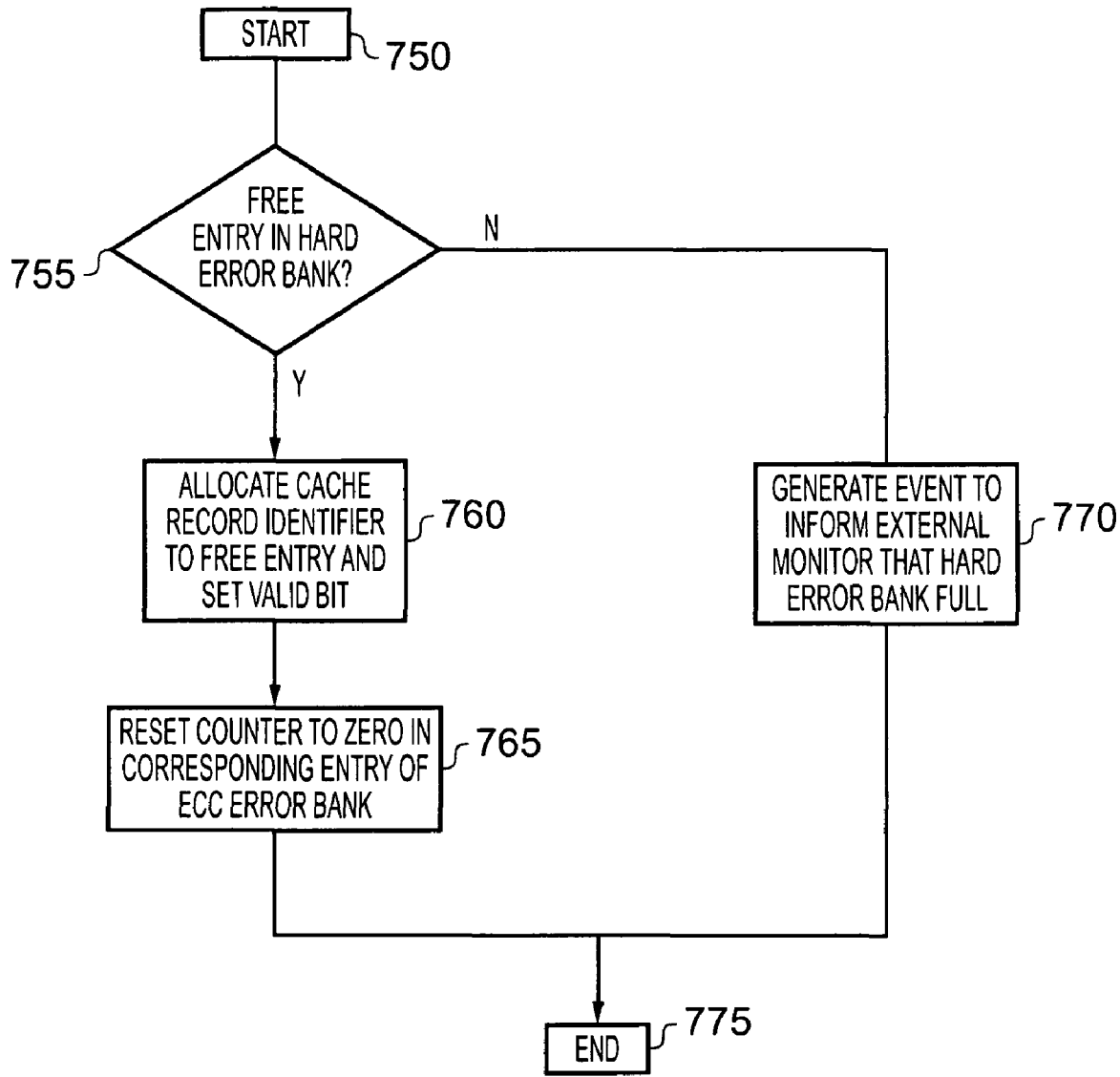
FIG. 11 is a flow diagram illustrating how the push request issued in FIG. 10 is processed in accordance with one embodiment.

FIG. 11 is a flow diagram illustrating how the push request issued at step 720 of FIG. 10 is handled by the hard error bank 78 in accordance with one embodiment. At step 750, the process starts, whereafter at step 755 it is determined whether there is a free hard error record entry in the hard error bank. If there is, then the process proceeds to step 760 where the cache record identifier is allocated into that free entry and the valid bit is set to identify that that entry in the hard error bank is no longer free, and contains valid data specifying a particular cache record. Following step 760, the counter is reset to zero in the corresponding error record entry of the ECC error bank, thereby clearing that cache record identifier from the ECC error bank.

If at step 755, it is determined that no free entry in the hard error bank exists, then at step 770 an event is generated to inform an external monitor that the hard error bank is full. As with step 735 of FIG. 10, this can be used to initiate an external analysis process at a convenient point to analyse the cache records identified by the contents of the hard error bank. If any of those cache records can be determined not to be exhibiting true hard errors, for example because they were only exhibiting a transient fault which is no longer present, then the valid bit can be cleared for the relevant hard error record entry, thereby freeing up that entry for future allocation.

Following step 765 or step 770, the process then ends at step 775.

Figure 12:
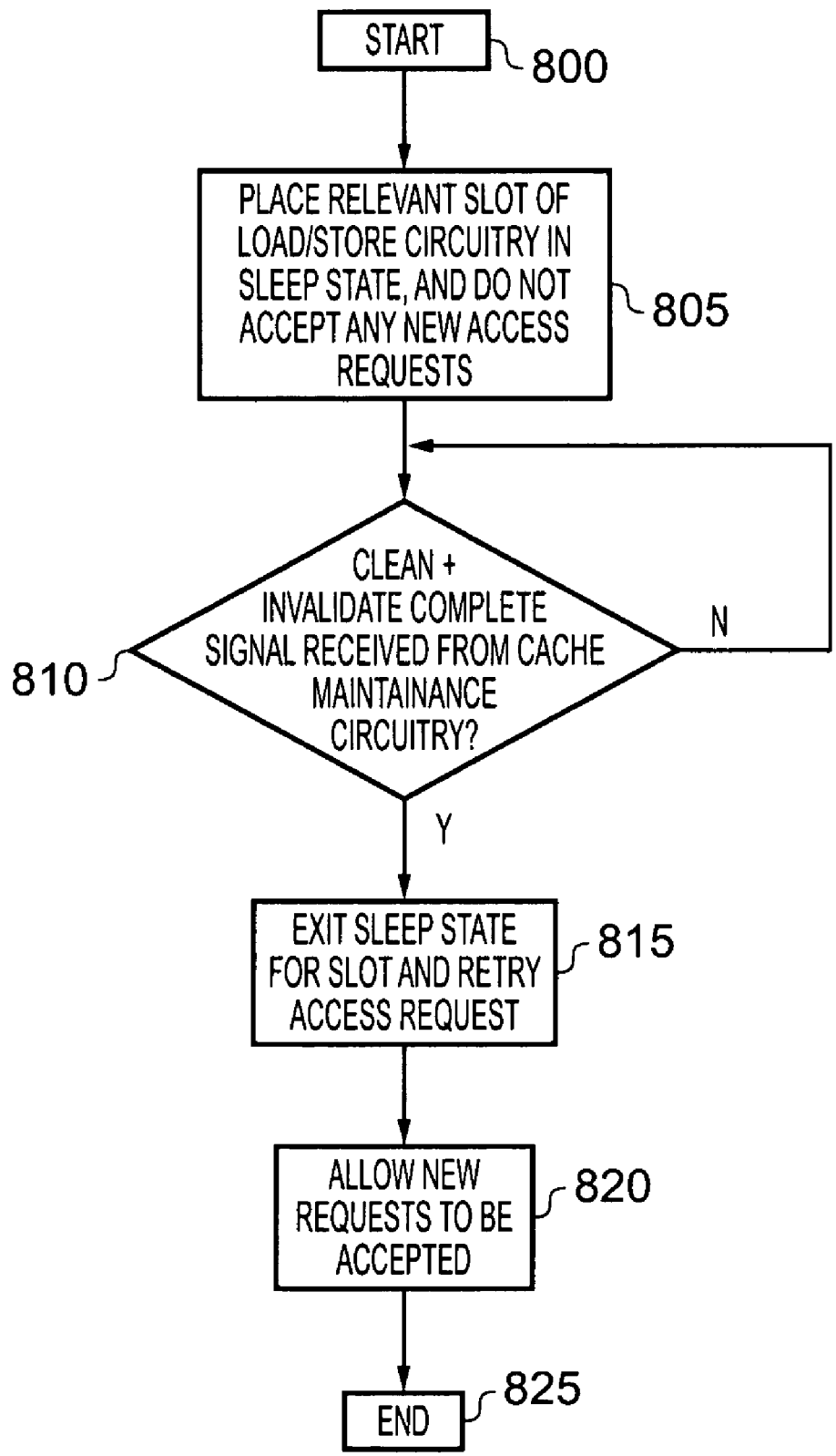
FIG. 12 illustrates how the retry request issued in FIG. 8 is processed in accordance with one embodiment.

FIG. 12 is a flow diagram illustrating the handling by the load/store circuitry 60 of the retry request issued at step 325 of FIG. 8. At step 800, the process starts, whereafter at step 805 the relevant slot of the load/store circuitry storing the details of the associated access request is placed into a sleep state, and no new access requests are accepted by the load/store circuitry. However, any other pending access requests already stored in other slots of the load/store circuitry will typically be allowed to continue, assuming they are not dependent on the access request that is currently in the sleep state being completed before they are performed. However, these slots may see the same or another error, in which event they would then also go into sleep state.

At step 810, the load/store circuitry awaits receipt of a clean and invalidate complete signal from the cache maintenance circuitry 80. Upon receipt of that clean and invalidate complete signal, the load/store circuitry exits the sleep state for the relevant slot and retries the access request at step 815. Thereafter, at step 820, new access requests are allowed to be accepted by the load/store circuitry, and thereafter the process ends at step 825.

Figure 13:
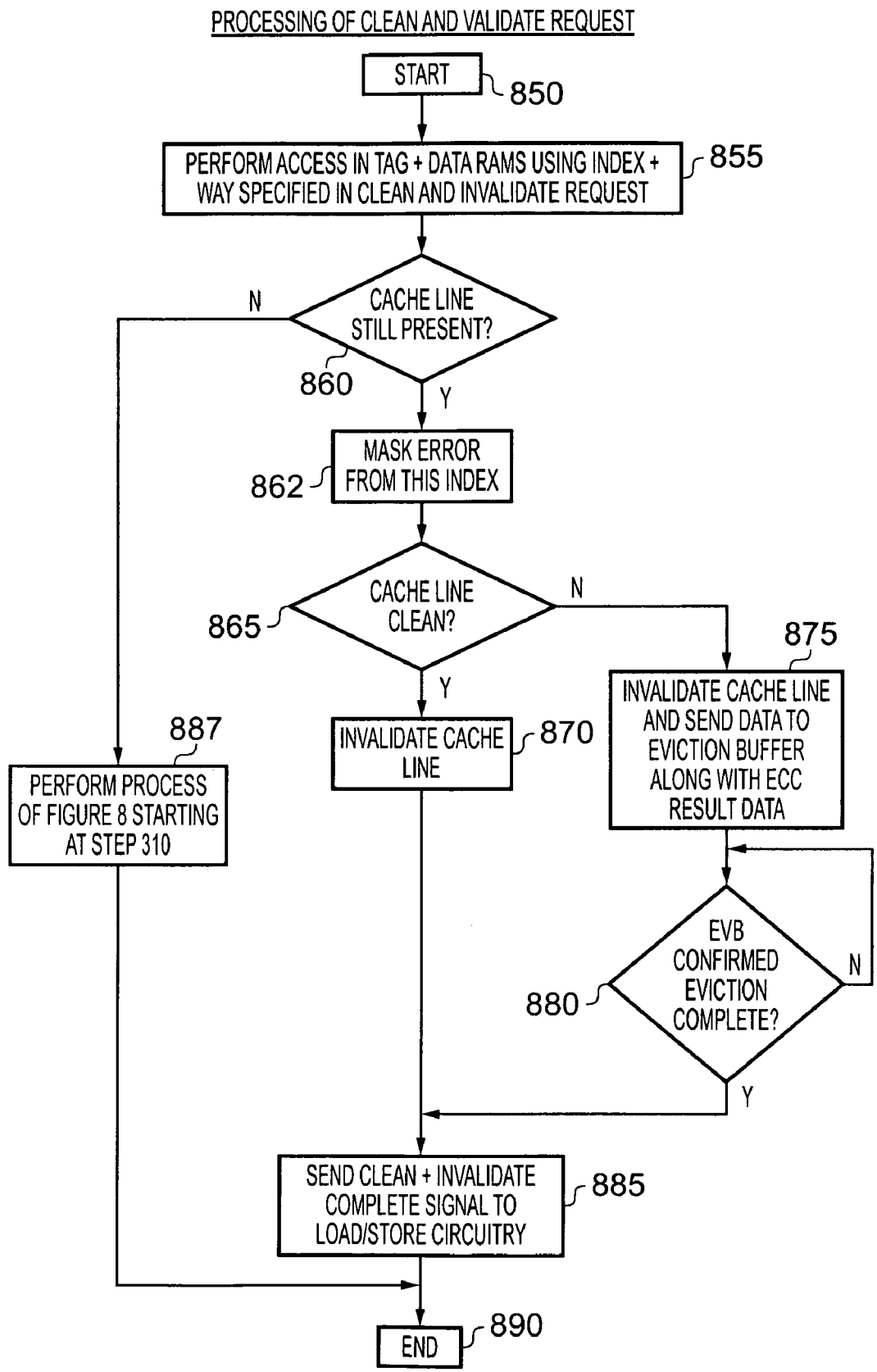
FIG. 13 is a flow diagram illustrating how the clean and invalidate request issued in FIG. 8 is processed in accordance with one embodiment.

FIG. 13 illustrates the handling by the cache maintenance circuitry 80 of the clean and invalidate request issued at step 330 of FIG. 8. As discussed earlier in association with FIG. 4, the cache maintenance circuitry will only clean and invalidate a single cache record in response to each clean and invalidate request issued by the ECC and hit detection circuitry 66. Hence, following the start of the cache maintenance operation at step 850, the cache maintenance circuitry 80 will determine which cache record to clean and invalidate in the event that more than one cache record has been identified as containing errors during the cache access procedure. Then, at step 855, an access is performed in the tag and data RAMs for the identified cache record using the index and way values specified by side band signals associated with the clean and invalidate request.

At step 860, it is then determined whether the cache record contents that gave rise to the original error are still present in that cache record. In particular, there can be a delay between the error being detected and the cache maintenance operation being performed to clean and invalidate the line. If, in the interim, a linefill operation has been performed which has removed the contents from the relevant cache record and replaced them with entirely new contents, then it is clearly no longer appropriate to perform any clean and invalidate operation. This can simply be detected by checking whether the tag value of the cache record contents that gave rise to the original error is still the same as the tag value stored in the relevant tag RAM entry subjected to the lookup at step 855. If the cache line is not still present, then the process proceeds to step 887 where the process of FIG. 8 is performed starting at step 310. Hence, at this point the access performed at step 855 is treated like any other access, and hence subjected to the normal error checks, and any resulting ECC error bank updates are performed. Indeed, if the original error that gave rise to the original clean and invalidate request being issued was due to a hard error, then the access performed in response to the clean and invalidate operation initiated at step 850 will cause the re-detection of the error when step 887 is performed, and this will itself initiate a new correction operation. Following step 887, the process ends at step 890.

However, assuming the cache line is still present, then at step 862 any error detected as part of the access operation at step 855 is masked to prevent accounting twice for the same error, and it is then determined at step 865 whether the cache line is clean. If it is, then the cache line is invalidated at step 870, and a clean and invalidate complete signal is sent to the load/store circuitry at step 885.

However, if the cache line is not clean, the cache line is invalidated at step 875 and the data held in the cache line of that cache record is sent to the eviction buffer 72 along with the ECC result data, i.e. the output from the error correction process performed when performing the lookup at step 855. The correction circuitry included in the eviction buffer enables the correction.

At step 880, the process stalls awaiting confirmation from the eviction buffer that the eviction is complete. Once the eviction is complete, the process proceeds to step 885, where the clean and invalidate complete signal is issued to the load/store circuitry, whereafter the process ends at step 890.

Whilst in the flow diagrams of FIGS. 8 to 13, many steps have been shown as being performed in a serial manner, it will be appreciated that in modern data processing systems, it will be possible to implement various of the steps in parallel, and hence the flow diagrams of FIGS. 8 to 13 are intended to illustrate the steps taken in the described embodiment, rather than indicating that all of those steps have to be performed in a particular order or sequence.

From the above description of embodiments of the present invention, it will be seen that such embodiments provide a simple and effective hardware mechanism for detecting hard and soft errors, whilst ensuring that only cache records exhibiting hard errors are masked from future use by the cache. This increases the availability of the system by reducing the need for dedicated systems/software to be used to analyse the fault. This can hence enable a decrease in the area of the apparatus, the need for an external validation and the need for a dedicated slave port on the RAM interface in embodiments where there is no external monitor. Moreover, it increases the availability of the system as soft errors are discarded from the ECC error bank through the whole life of the system, and only hard errors are promoted to the hard error bank.

The technique of embodiments is very flexible in that it does not depend on the ECC scheme implemented. Both clean and invalidate plus replay, or write back plus replay, schemes can be used. Further, the threshold value used to determine when errors should be pushed from the ECC error bank to the hard error bank can be tuned to enable the system to detect intermittent faults in the system if desired.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
   processing circuitry for performing data processing operations;
   cache storage having a plurality of cache records for storing data values for access by the processing circuitry when performing said data processing operations, each cache record for storing one or more data values, an associated address indication for said one or more data values, and error detection data;
   cache control circuitry for controlling access to said cache storage, said cache control circuitry including error detection circuitry, responsive to a cache record of the cache storage being accessed, to perform an error detection operation to determine with reference to the error detection data stored in said cache record whether an error condition exists for said cache record;
   cache record error storage having at least one error record, each error record for storing a cache record identifier identifying a cache record for which said error condition has been detected, and an associated count value;
   on performance of said error detection operation for a currently accessed cache record, the error detection circuitry causing said cache record error storage to be accessed to determine whether the cache record identifier for said currently accessed cache record is already stored in the cache record error storage;
   if the cache record identifier for said currently accessed cache record is already stored in the cache record error storage, then if the error condition is detected on performance of said error detection operation, said count value associated with that cache record identifier is adjusted in a first direction, and if the error condition is not detected on performance of said error detection operation, said count value associated with that cache record identifier is adjusted in a second direction;
   if the cache record identifier for said currently accessed cache record is not already stored in the cache record error storage, and said error condition is detected on performance of said error detection operation, one of said at least one error records in the cache record error storage is allocated to store the cache record identifier for the currently accessed cache record, and the associated count value is set to a first value;
   on detection of said error condition when performing said error detection operation, the error detection circuitry further causing a correction operation to be performed in respect of the currently accessed cache record, and causing the access to the currently accessed cache record to be re-performed;
   the data processing apparatus further comprising a hard error storage having at least one hard error record, when the associated count value for a cache record identifier stored in the cache record error storage reaches a predetermined threshold value, said cache record identifier being stored in one of said at least one hard error records of the hard error storage; and
   any cache record whose cache record identifier is stored in the hard error storage being logically excluded from the plurality of cache records of the cache storage for the purposes of subsequent operation of the cache storage.

2. A data processing apparatus as claimed in claim 1, wherein said count value is adjusted in said first direction by incrementing said count value, and is adjusted in said second direction by decrementing said count value.

3. A data processing apparatus as claimed in claim 2, wherein said first value to which the count value is set is a logic one value, the predetermined threshold value is at least two, and if the count value is decremented to a logic zero value, the error record storing that logic zero count value is considered to be unallocated.

4. A data processing apparatus as claimed in claim 3, wherein the predetermined threshold value is programmable.

5. A data processing apparatus as claimed in claim 1, wherein if the cache record identifier for said currently accessed cache record is not already stored in the cache record error storage, said error condition is detected on performance of said error detection operation, but no error record in the cache record error storage is available to be allocated to store the cache record identifier for the currently accessed cache record, an event signal is generated to identify that the allocation to the cache record error storage failed.

6. A data processing apparatus as claimed in claim 1, wherein if the associated count value for a cache record identifier stored in the cache record error storage reaches a predetermined threshold value, but no hard error record in the hard error storage is available to store said cache record identifier, an event signal is generated to identify that the store to the hard error storage failed.

7. A data processing apparatus as claimed in claim 1, wherein the cache storage comprises data storage having a plurality of cache lines for storing data values, and address storage having a plurality of entries, each entry identifying for an associated cache line said address indication, and each cache record of the cache storage comprises an entry from the address storage and the associated cache line from the data storage.

8. A data processing apparatus as claimed in claim 7, wherein the error detection data comprises first error detection data for the entry in the address storage and second error detection data for the associated cache line in the data storage.

9. A data processing apparatus as claimed in claim 8, wherein said cache record identifier identifies whether the error has been detected in the entry from the address storage or the associated cache line from the data storage.

10. A data processing apparatus as claimed in claim 8, wherein the content of each cache record further includes a valid identifier identifying if the cache record's contents are valid, and for said currently accessed cache record the error detection circuitry only performs error detection in respect of the data in the associated cache line of the data storage using the second error detection data if the valid identifier is set.

11. A data processing apparatus as claimed in claim 1, wherein said correction operation comprises a clean and invalidate operation.

12. A data processing apparatus as claimed in claim 11, further comprising:
    cache maintenance circuitry for performing said clean and invalidate operation;
    the access to the currently accessed cache record only being re-performed on issuance of a completion signal from the cache maintenance operation identifying that said clean and invalidate operation has completed.

13. A data processing apparatus as claimed in claim 12, wherein the cache maintenance circuitry first checks that the address indication for the currently accessed cache record has not changed since the error condition was detected before performing said clean and invalidate operation.

14. A data processing apparatus as claimed in claim 1, wherein the content of each cache record further includes a valid identifier identifying if the cache record's contents are valid, and the error detection circuitry determines whether the error condition exists even if the valid identifier as stored in the cache record being accessed indicates that the cache record's contents are invalid.

15. A data processing apparatus as claimed in claim 1, wherein when a cache record in the cache storage needs to be selected as an allocated cache record for the storage of data values for access by the processing circuitry, any cache record whose cache record identifier is stored in the hard error storage is excluded from selection as the allocated cache line.

16. A data processing apparatus as claimed in claim 1, wherein:
  the cache storage is an n way set associative cache, and an access performed in response to a request from the processing circuitry is performed in respect of a set in the cache having a cache record in each way of the cache storage;
  said cache record identifier identifies the associated cache record by identifying a cache set and a cache way; and
  on performing an access to a specified set, the error detection circuitry performs error detection for each cache record in the specified set other than any cache record of the specified set identified in the hard error storage.

17. A data processing apparatus as claimed in claim 1, wherein the cache record error storage is formed as a fully associative cache.

18. A data processing apparatus as claimed in claim 1, wherein the hard error storage is formed as a fully associative cache.

19. A method of handling hard errors in a data processing apparatus comprising processing circuitry for performing data processing operations, and cache storage having a plurality of cache records for storing data values for access by the processing circuitry when performing said data processing operations, each cache record for storing one or more data values, an associated address indication for said one or more data values, and error detection data, the method comprising the steps of:
  responsive to a cache record of the cache storage being accessed, performing an error detection operation to determine with reference to the error detection data stored in said cache record whether an error condition exists for said cache record;
  providing cache record error storage having at least one error record, each error record for storing a cache record identifier identifying a cache record for which said error condition has been detected, and an associated count value;
  on performance of said error detection operation for a currently accessed cache record, causing said cache record error storage to be accessed to determine whether the cache record identifier for said currently accessed cache record is already stored in the cache record error storage;
  if the cache record identifier for said currently accessed cache record is already stored in the cache record error storage, then responsive to the error condition being detected on performance of said error detection operation, adjusting said count value associated with that cache record identifier in a first direction, and responsive to the error condition not being detected on performance of said error detection operation, adjusting said count value associated with that cache record identifier in a second direction;
  if the cache record identifier for said currently accessed cache record is not already stored in the cache record error storage, and said error condition is detected on performance of said error detection operation, allocating one of said at least one error records in the cache record error storage to store the cache record identifier for the currently accessed cache record, and setting the associated count value to a first value;
  on detection of said error condition when performing said error detection operation, performing a correction operation in respect of the currently accessed cache record, and then re-performing the access to the currently accessed cache record;
  providing a hard error storage having at least one hard error record;
  when the associated count value for a cache record identifier stored in the cache record error storage reaches a predetermined threshold value, storing that cache record identifier in one of said at least one hard error records of the hard error storage; and
  logically excluding any cache record whose cache record identifier is stored in the hard error storage from the plurality of cache records of the cache storage for the purposes of subsequent operation of the cache storage.

20. A data processing apparatus comprising:
  processing means for performing data processing operations;
  cache storage means having a plurality of cache record means for storing data values for access by the processing means when performing said data processing operations, each cache record means for storing one or more data values, an associated address indication for said one or more data values, and error detection data;
  cache control means for controlling access to said cache storage means, said cache control means including error detection means, responsive to a cache record means of the cache storage means being accessed, for performing an error detection operation to determine with reference to the error detection data stored in said cache record means whether an error condition exists for said cache record means;
  cache record error storage means having at least one error record means, each error record means for storing a cache record identifier identifying a cache record means for which said error condition has been detected, and an associated count value;
  on performance of said error detection operation for a currently accessed cache record means, the error detection means for causing said cache record error storage means to be accessed to determine whether the cache record identifier for said currently accessed cache record means is already stored in the cache record error storage means;
  if the cache record identifier for said currently accessed cache record means is already stored in the cache record error storage means, then if the error condition is detected on performance of said error detection operation, said count value associated with that cache record identifier is adjusted in a first direction, and if the error condition is not detected on performance of said error detection operation, said count value associated with that cache record identifier is adjusted in a second direction;

if the cache record identifier for said currently accessed cache record means is not already stored in the cache record error storage means, and said error condition is detected on performance of said error detection operation, one of said at least one error record means in the cache record error storage means is allocated to store the cache record identifier for the currently accessed cache record means, and the associated count value is set to a first value;

on detection of said error condition when performing said error detection operation, the error detection means further for causing a correction operation to be performed in respect of the currently accessed cache record means, and causing the access to the currently accessed cache record means to be re-performed;

the data processing apparatus further comprising a hard error storage means having at least one hard error record means, when the associated count value for a cache record identifier stored in the cache record error storage means reaches a predetermined threshold value, said cache record identifier being stored in one of said at least one hard error record means of the hard error storage means; and any cache record means whose cache record identifier is stored in the hard error storage means being logically excluded from the plurality of cache record means of the cache storage means for the purposes of subsequent operation of the cache storage means.

* * * * *